(12) United States Patent
Uphoff et al.

(10) Patent No.: US 10,346,479 B2
(45) Date of Patent: Jul. 9, 2019

(54) FACILITATING INTERACTION WITH SYSTEM LEVEL SEARCH USER INTERFACE

(75) Inventors: Brian E. Uphoff, Seattle, WA (US); Xiao Wei, Redmond, WA (US); Priya Vaidyanathan, Clyde Hill, WA (US); Edward Boyle Averett, Kirkland, WA (US); Rolf A. Ebeling, Kirkland, WA (US); Michael J. Gilmore, Bothell, WA (US); Manav Mishra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 298 days.

(21) Appl. No.: 13/229,496

(22) Filed: Sep. 9, 2011

(65) Prior Publication Data

US 2012/0124519 A1 May 17, 2012

Related U.S. Application Data

(63) Continuation-in-part of application No. 12/947,292, filed on Nov. 16, 2010, now abandoned.

(51) Int. Cl.
*G06F 17/30* (2006.01)
*G06F 16/9038* (2019.01)
(Continued)

(52) U.S. Cl.
CPC ........ *G06F 16/9038* (2019.01); *G06F 16/148* (2019.01); *G06F 16/903* (2019.01)

(58) Field of Classification Search
CPC .................................................. G06F 17/30964
(Continued)

(56) References Cited

U.S. PATENT DOCUMENTS 6,418,429 B1 7/2002 Borovoy et al.
6,708,162 B1 3/2004 Morgan et al.
(Continued)

FOREIGN PATENT DOCUMENTS

CA 2763668 A1 12/2010
CN 1716255 1/2006
(Continued)

OTHER PUBLICATIONS

"Corrected Notice of Allowance", U.S. Appl. No. 12/947,170, (dated Jul. 26, 2013), 5 pages.
(Continued)

*Primary Examiner* — Jean M Corrielus
(74) *Attorney, Agent, or Firm* — Newport IP, LLC; Scott Y. Shigeta

(57) ABSTRACT

A system level search user interface that includes both a data entry portion and a search identification portion is displayed. Data input by a user as a search term is displayed in the data entry portion, and identifiers of each of one or more scopes on the computing device that can be searched using the search term are displayed in the search identification portion. Search results based on a selected scope are displayed in a search results portion of the system level search user interface. A set of keyboard shortcuts allow users to quickly search using any of the scopes, and see previews of a number of results that each of the scopes return. Additionally, the system level search user interface allow users to easily focus on different search result entries, and efficiently change scopes for searching.

19 Claims, 13 Drawing Sheets

(51) Int. Cl.
*G06F 16/14* (2019.01)
*G06F 16/903* (2019.01)

(58) Field of Classification Search
USPC .......................................................... 707/705
See application file for complete search history.

(56) References Cited

U.S. PATENT DOCUMENTS

| | | | |
|---|---|---|---|
| 6,847,959 | B1 | 1/2005 | Arrouye et al. |
| 7,272,601 | B1 | 9/2007 | Wang et al. |
| 7,379,965 | B2 | 5/2008 | Sherwood et al. |
| 7,451,136 | B2 | 11/2008 | Chua et al. |
| 7,461,059 | B2 | 12/2008 | Richardson et al. |
| 7,499,940 | B1 * | 3/2009 | Gibbs |
| 7,552,400 | B1 * | 6/2009 | Sriver .................... G06F 3/0485 |
| | | | 715/827 |
| 7,725,485 | B1 | 5/2010 | Sahami et al. |
| 7,840,579 | B2 * | 11/2010 | Samuelson ....... G06F 17/30873 |
| | | | 707/758 |
| 7,890,526 | B1 | 2/2011 | Brewer et al. |
| 7,890,886 | B2 | 2/2011 | Matthews et al. |
| 7,958,143 | B1 | 6/2011 | Amacker |
| 8,060,487 | B2 | 11/2011 | Schmidt-Karaca et al. |
| 8,176,068 | B2 | 5/2012 | Kunjithapatham et al. |
| 8,204,897 | B1 | 6/2012 | Djabarov et al. |
| 8,332,748 | B1 * | 12/2012 | Karam ............... G06F 17/30672 |
| | | | 715/246 |
| 8,515,984 | B2 | 8/2013 | Gebhard et al. |
| 8,694,483 | B2 | 4/2014 | Roulland et al. |
| 8,825,694 | B2 * | 9/2014 | Samuelson ....... G06F 17/30873 |
| | | | 707/767 |
| 9,037,565 | B2 | 5/2015 | Vaidyanathan et al. |
| 2002/0109725 | A1 | 8/2002 | Suzuki et al. |
| 2005/0065922 | A1 | 3/2005 | Miller et al. |
| 2005/0102280 | A1 | 5/2005 | Tanaka et al. |
| 2005/0149496 | A1 | 7/2005 | Mukherjee et al. |
| 2005/0154723 | A1 | 7/2005 | Liang |
| 2005/0234879 | A1 | 10/2005 | Zeng et al. |
| 2005/0278321 | A1 | 12/2005 | Vailaya et al. |
| 2006/0053065 | A1 | 3/2006 | Bowman |
| 2006/0112179 | A1 | 5/2006 | Baumeister et al. |
| 2006/0136378 | A1 | 6/2006 | Martin |
| 2006/0136389 | A1 | 6/2006 | Cover et al. |
| 2006/0190436 | A1 | 8/2006 | Richardson et al. |
| 2006/0200827 | A1 | 9/2006 | Sidlosky et al. |
| 2006/0248050 | A1 | 11/2006 | Brooks et al. |
| 2006/0256088 | A1 * | 11/2006 | Kong ............................ 345/168 |
| 2007/0038602 | A1 | 2/2007 | Weyand et al. |
| 2007/0061308 | A1 | 3/2007 | Hartwell et al. |
| 2007/0067292 | A1 | 3/2007 | Trowbridge et al. |
| 2007/0100890 | A1 | 5/2007 | Kim |
| 2007/0118499 | A1 | 5/2007 | Hwang et al. |
| 2007/0143251 | A1 | 6/2007 | Brooks et al. |
| 2007/0156747 | A1 * | 7/2007 | Samuelson ....... G06F 17/30873 |
| 2007/0174244 | A1 | 7/2007 | Jones |
| 2007/0174286 | A1 * | 7/2007 | Seitz ................. G06F 17/30864 |
| 2007/0239671 | A1 | 10/2007 | Whitman et al. |
| 2007/0265831 | A1 | 11/2007 | Dinur et al. |
| 2008/0033954 | A1 | 2/2008 | Brooks et al. |
| 2008/0077571 | A1 | 3/2008 | Harris et al. |
| 2008/0208834 | A1 * | 8/2008 | Boyer et al. ..................... 707/5 |
| 2008/0222569 | A1 | 9/2008 | Champion |
| 2008/0306933 | A1 | 12/2008 | Valliani et al. |
| 2009/0006357 | A1 | 1/2009 | Popescul et al. |
| 2009/0019002 | A1 | 1/2009 | Boulis |
| 2009/0024613 | A1 | 1/2009 | Niu et al. |
| 2009/0043741 | A1 | 2/2009 | Kim |
| 2009/0055388 | A1 | 2/2009 | Song et al. |
| 2009/0063448 | A1 | 3/2009 | DePue et al. |
| 2009/0077037 | A1 | 3/2009 | Wu et al. |
| 2009/0089260 | A1 | 4/2009 | Chong et al. |
| 2009/0094221 | A1 | 4/2009 | Cameron et al. |
| 2009/0112848 | A1 | 4/2009 | Kunjithapatham et al. |
| 2009/0187515 | A1 | 7/2009 | Andrew et al. |
| 2009/0210404 | A1 | 8/2009 | Wilson |
| 2009/0234722 | A1 | 9/2009 | Evevsky |
| 2009/0234808 | A1 | 9/2009 | Zarzar et al. |
| 2009/0248666 | A1 | 10/2009 | Ahluwalia |
| 2009/0292538 | A1 | 11/2009 | Barnish |
| 2010/0005443 | A1 | 1/2010 | Kwok et al. |
| 2010/0057702 | A1 | 3/2010 | Ghosh et al. |
| 2010/0082649 | A1 | 4/2010 | Gutt et al. |
| 2010/0100839 | A1 * | 4/2010 | Tseng .................... G06F 1/1624 |
| | | | 715/780 |
| 2010/0138445 | A1 | 6/2010 | Luoma et al. |
| 2010/0161594 | A1 | 6/2010 | Prasad et al. |
| 2010/0185644 | A1 | 7/2010 | Gutt et al. |
| 2010/0231533 | A1 * | 9/2010 | Chaudhri ...................... 345/173 |
| 2010/0268661 | A1 | 10/2010 | Levy et al. |
| 2010/0306191 | A1 | 12/2010 | Lebeau et al. |
| 2010/0306215 | A1 | 12/2010 | Azar et al. |
| 2011/0191364 | A1 | 8/2011 | LeBeau |
| 2011/0258584 | A1 | 10/2011 | Williams et al. |
| 2011/0314004 | A1 | 12/2011 | Mehta |
| 2011/0320481 | A1 | 12/2011 | Huang |
| 2012/0030226 | A1 | 2/2012 | Holt et al. |
| 2012/0124035 | A1 | 5/2012 | Vaidyanathan |
| 2012/0124071 | A1 | 5/2012 | Gebhard |
| 2012/0124072 | A1 | 5/2012 | Vaidyanathan |
| 2012/0130814 | A1 | 5/2012 | Hayes |
| 2013/0198220 | A1 | 8/2013 | Vaidyanathan et al. |
| 2013/0212099 | A1 | 8/2013 | Dellinger et al. |
| 2013/0304757 | A1 | 11/2013 | Gebhard et al. |
| 2017/0220680 | A1 * | 8/2017 | Shattuck ........... G06F 17/30864 |

FOREIGN PATENT DOCUMENTS

| | | |
|---|---|---|
| CN | 101261565 | 9/2008 |
| CN | 101268463 | 9/2008 |
| CN | 101395604 | 3/2009 |
| CN | 101467147 | 6/2009 |
| CN | 101539836 | 9/2009 |
| CN | 101673176 | 3/2010 |
| CN | 101782833 | 7/2010 |
| CN | 101894395 | 3/2011 |
| CN | 102426607 | 4/2012 |
| JP | 01152527 | 6/1989 |
| JP | 6251064 A | 9/1994 |
| JP | 2001331486 | 11/2001 |
| JP | 2003523568 | 8/2003 |
| JP | 2005258524 | 9/2005 |
| JP | 2005327221 | 11/2005 |
| JP | 2006107113 A | 4/2006 |
| JP | 2007200243 | 8/2007 |
| JP | 2009037501 | 2/2009 |
| JP | 2009059264 A | 3/2009 |
| JP | 2009530708 | 8/2009 |
| JP | 2010092383 | 4/2010 |
| JP | 2010212841 A | 9/2010 |
| JP | 2011170813 A | 9/2011 |
| KR | 20050026142 A | 3/2005 |
| KR | 10-2005-0082459 A | 8/2005 |
| KR | 100621194 | 8/2006 |
| KR | 10-2007-0034313 A | 3/2007 |
| KR | 20070111275 | 11/2007 |
| KR | 20090002226 A | 1/2009 |
| KR | 20100053269 | 5/2010 |
| RU | 2008114390 | 10/2009 |
| RU | 2009145272 | 6/2011 |
| TW | 200809549 | 2/2008 |
| TW | 200813755 | 3/2008 |
| TW | 200923690 | 6/2009 |
| WO | WO-0153936 | 7/2001 |
| WO | 2009137292 A2 | 11/2009 |

OTHER PUBLICATIONS

"Non-Final Office Action", U.S. Appl. No. 12/947,486, (dated Sep. 13, 2013),16 pages.

Manning, Vivian., "So Long Launchy—Welcome Windows 7 Search", Retrieved at <<http://vmanning.posterous.com/so-long-launchy-welcome-windows-7-search>>, Feb. 14, 2011, pp. 2.

(56) References Cited

OTHER PUBLICATIONS

"Quick Look Previews in Spotlight Menu", Retrieved at <<http://mattgemmell.com/2011/07/24/quick-look-previews-in-spotlight-menu>>, Retrieved Date: Aug. 31, 2011, pp. 5.
Chavez, Conrad., "Mac OS X: Keyboard Shortcuts to Launch any Application", Retrieved at <<http://blog.conradchavez.com/2007/06/28/mac-os-x-keyboard-shortcuts-for-any-application/>>, Jun. 28, 2007, pp. 9.
"Exploring Windows 7's New Search Features (Part 1)", Retrieved at <<http://www.windowsnetworking.com/articles_tutorials/Exploring-Windows-7s-New-Search-Features-Part1.html>>, Retrieved Date: Aug. 31, 2011, pp. 12.
"Windows 7 Tools—Windows Search Tools", Retrieved at <<http://www.kodyaz.com/articles/windows-7-tools-for-windows-search-options.aspx>>, Retrieved Date: Aug. 31, 2011, pp. 5.
"Overview of the Main Window", Retrieved at <<http://help.copernic.com/topic/desktopsearch11en/di_overview.htm>>, Retrieved Date: Aug. 31, 2011, pp. 4.
"Non-Final Office Action", U.S. Appl. No. 12/947,292, dated Aug. 29, 2014, 20 pages.
"Non-Final Office Action", U.S. Appl. No. 13/942,050, dated Sep. 25, 2014, 21 pages.
"Foreign Office Action", CN Application No. 201110362987.8, dated Jul. 28, 2014, 7 Pages.
"Foreign Office Action", CN Application No. 201110362974.0, dated Sep. 22, 2014, 7 Pages.
"Final Office Action", U.S. Appl. No. 13/801,637, dated Jan. 3, 2014, 26 pages.
"Foreign Office Action", CN Application No. 201110362987.8, dated Dec. 4, 2013, 7 Pages.
"Foreign Office Action", CN Application No. 201110362974.0, dated Jan. 24, 2014, 12 Pages.
"Foreign Office Action", CN Application No. 201110363012.7, dated Apr. 18, 2014, 9 Pages.
"Foreign Office Action", CN Application No. 201110363012.7, dated Sep. 23, 2013, 10 Pages.
"Final Office Action", U.S. Appl. No. 12/947,486, dated Jun. 19, 2014, 17 pages.
"Non-Final Office Action", U.S. Appl. No. 12/947,486, dated Jan. 5, 2015, 18 pages.
"Notice of Allowance", U.S. Appl. No. 13/801,637, dated Jan. 22, 2015, 8 pages.
"Foreign Office Action", CN Application No. 201110363012.7, dated Oct. 27, 2014, 9 Pages.
"Foreign Notice of Allowance", CN Application No. 201110362974.0, dated Mar. 2, 2015, 4 Pages.
"Foreign Office Action", CN Application No. 201110362987.8, dated Feb. 9, 2015, 8 Pages.
"Foreign Office Action", CN Application No. 201210328934.9, dated Feb. 3, 2015, 14 pages.
"Non-Final Office Action", U.S. Appl. No. 13/942,050, dated Apr. 3, 2015, 22 pages.
"Foreign Office Action", CN Application No. 201110362987.8, dated Aug. 7, 2015, 8 Pages.
"Foreign Office Action", CN Application No. 201210328934.9, dated Sep. 28, 2015, 12 Pages.
"Foreign Office Action", TW Application No. 100135901, dated Sep. 25, 2015, 13 pages.
"Foreign Office Action", TW Application No. 100137155, dated Sep. 10, 2015, 11 pages.
"Non-Final Office Action", U.S. Appl. No. 13/942,050, dated Oct. 5, 2015, 22 pages.
"Foreign Notice of Allowance", JP Application No. 2013-539884, dated Oct. 7, 2015, 4 Pages.
"Foreign Notice of Allowance", TW Application No. 100135901, dated Dec. 22, 2015, 4 pages.
"Foreign Office Action", JP Application No. 2013-539885, dated Nov. 2, 2015, 7 pages.
"Foreign Notice of Allowance", CN Application No. 201110362987.8, dated Feb. 29, 2016, 4 Pages.

"Foreign Notice of Allowance", RU Application No. 2013122474, dated Nov. 23, 2015, 13 pages.
"Foreign Office Action", AU Application No. 2011329315, dated Mar. 8, 2016, 3 pages.
"Foreign Office Action", CN Application No. 201210328934.9, dated Mar. 29, 2016, 11 Pages.
"Search Report Issued in European Patent Application No. 12829328.9", dated Apr. 1, 2016, 10 Pages.
"Office Action Issued in Japanese Patent Application No. 2014-529804", dated Mar. 22, 2016, 8 Pages.
"Final Office Action Issued in U.S. Appl. No. 12/947,486", dated Apr. 19, 2016, 16 pages.
"Final Office Action Issued in U.S. Appl. No. 12/947,486", dated Apr. 21, 2016, 24 pages.
"Spotlight", Retrieved at: http://web.archive.org/web/20050904034342/http://en.wikipedia.org/wiki/Spotlight_%28software%29, Aug. 25, 2016, 2 pages.
"Accessibility features of Firefox", https://web.archive.org/web/20160506080507/http://kb.mozillazine.org/Accessibility_features_of_Firefox, Sep. 6, 2011, 5 pages.
"Group Policy for Windows Search, Browse, and Organize", Retrieved at: http://technet.microsoft.com/en-us/library/dd744697—on Dec. 1, 2016, 7 pages.
"Foreign Office Action", RU Application No. 2014108602, dated Aug. 3, 2016, 7 pages.
"Extended European Search Report", EP Application No. 11841470.5, dated Nov. 22, 2016, 9 pages.
Walsh,"Add Your Website to Firefox's Search Bar Using OpenSearch", Retrieved at: https://davidwalsh.name/open-search, Dec. 3, 2008, 8 pages.
"Foreign Office Action", AU Application No. 2012304710, dated Jan. 18, 2017, 5 pages.
"Foreign Office Action", AU Application No. 2012304710, dated Nov. 24, 2016, 5 pages.
"Foreign Office Action", JP Application No. 2014-529804, dated Nov. 15, 2016, 8 pages.
"KDE UserBase Wiki Plasma/ KRunner", Retrieved at: https://userbase.kde.org/Plasma/Krunner, 3 pages.
"Non-Final Office Action", U.S. Appl. No. 12/947,486, dated Jan. 31, 2017, 17 pages.
"Non-Final Office Action", U.S. Appl. No. 13/942,050, dated Jan. 30, 2017, 24 pages.
Asyunin,"[iPad, iPhone]", Retrieved at: http://www.appbank.net/2011/07/18/iphone-application/277473.php, Jul. 18, 2011, 11 pages.
Boschi,"KRunner auto-launch feedback", Retrieved at: https://liveblue.wordpress.com/2011/04/11/krunner-auto-launch-feedback/, Apr. 11, 2011, 5 pages.
"Foreign Notice of Allowance", JP Application No. 2014-529804, dated Apr. 4, 2017, 4 pages.
"Foreign Notice of Allowance", RU Application No. 2014108602, dated Mar. 1, 2017, 11 pages.
"Foreign Office Action", Application No. MX-a-2014-002786, dated Oct. 12, 2016, 5 pages.
"Foreign Office Action", EP Application No. 12829328.9, dated Mar. 3, 2017, 6 pages.
"Final Office Action", U.S. Appl. No. 12/947,486, dated Oct. 26, 2017, 16 pages.
"Foreign Office Action", CA Application No. 2,816,332, dated Sep. 26, 2017, 3 pages.
"Foreign Office Action", CN Application No. 201210328934.9, dated Aug. 31, 2017, 16 pages.
"Foreign Office Action", KR Application No. 10-2013-7012590, dated Sep. 29, 2017, 9 pages.
"Non-Final Office Action", U.S. Appl. No. 13/942,050, dated Nov. 1, 2017, 27 pages.
"Foreign Office Action", Application No. MX/a/2014/002786, dated Jun. 22, 2017, 7 pages.
"Foreign Office Action", EP Application No. 12829328.9, dated Sep. 18, 2017, 7 pages.
"Foreign Office Action", EP Application No. 11841470.5, dated Aug. 29, 2017, 8 pages.
"Foreign Office Action", EP Application No. 11841470.5, dated Mar. 6, 2018, 10 pages.

(56) References Cited

OTHER PUBLICATIONS

"Foreign Office Action", CN Application No. 201210328934.9, dated Sep. 1, 2016, 11 pages.
"Foreign Notice of Allowance", AU Application No. 2011329315, dated May 20, 2016, 2 pages.
"Foreign Office Action", AU Application No. 2012304710, dated Oct. 4, 2016, 6 pages.
"Extended European Search Report", EP Application No. 11841597.5, dated May 26, 2015, 7 pages.
"Non-Final Office Action", U.S. Appl. No. 12/947,292, (dated Mar. 30, 2012),19 pages.
"PCT Search Report and Written Opinion", Application Number PCT/US2011/059516, (dated Mar. 26, 2012),8 pages.
"International Search Report and Written Opinion", International Application No. PCT/US2011/059514, (dated May 21, 2012), 8 pages.
"Final Office Action", U.S. Appl. No. 12/947,292, (dated Dec. 3, 2012), 22 pages.
"Non-Final Office Action", U.S. Appl. No. 12/947,170, (dated Oct. 25, 2012), 12 pages.
"International Search Report", dated Dec. 28, 2012, Application No. PCT/US2012/053683, Filed date: Sep. 4, 2012, pp. 8.
"Foreign Office Action", Chinese Application No. 201110362974.0, (dated Mar. 29, 2013), 11 pages.
"Non-Final Office Action", U.S. Appl. No. 13/801,637, (dated Jun. 18, 2013), 23 pages.
"Notice of Allowance", U.S. Appl. No. 12/947,170, (dated Apr. 4, 2013), 9 pages.
Fluit, Christiaan "AutoFocus: Semantic Search for the Desktop", *Proceedings of the Ninth International Conference on Information Visualization*, (Jul. 2005), 8 pages.
"Generis iGoogle Gadget released—search across multiple repositories and repository types", Retrieved from: <http://www.generiscorp.com/blog/generis-igoogle-gadget-released-search-across-multiple-repositories-and-repository-types/> on Aug. 20, 2010, (Jun. 20, 2010), 2 pages.
"Launching Applications (ShellExecute, ShellExecuteEx, SHELLEXECUTEINFO)", Retrieved from: <http://msdn.microsoft.com/en-us/library/bb776886.aspx> on Aug. 20, 2010, (Jun. 30, 2010), 4 pages.
"Merging search suggestions. Merging search and address bar.", Retrieved from: <http://www.eggheadcafe.com/software/aspnet/33160047/merging-search-suggestions-merging-search-and-address-bar.aspx> on Aug. 23, 2010. (Sep. 24, 2008), 1 page.
"Search suggestions", Retrieved from: <http://support.mozilla.com/en-US/kb/Search+suggestions> on Aug. 23, 2010, (Aug. 19, 2009), 4 pages.
"Using the Android Search Dialog", Retrieved from: <http://developer.android.com/guide/topics/search/search-dialog.html> on Aug. 20, 2010, (Aug. 5, 2010), 8 pages.
Aiglstorfer, Rodney "Launching your own Application via a Custom URL Scheme", Retrieved from: <http://iphonedevelopertips.com/cocoa/launching-your-own-application-via-a-custom-url-scheme.html> on Aug. 20, 2010, (Dec. 14, 2008), 17 pages.
Bharat, Krishna "SearchPad: Explicit Capture of Search Context to Support Web Search", Retrieved from: <http://www9.org/w9cdrom/173/173.html> on Aug. 20, 2010, (May 2000), 11 pages.
Chirita, Paul-Alexandru et al., "Analyzing User Behavior to Rank Desktop Items", L3S Research Center, University of Hanover, Available at <http://www.l3s.de/~chirita/publications/chirita06analyzing.pdf>,(Oct. 13, 2006), 12 pages.
Ha, Anthony "Zoho lets users search across its business applications" Retrieved from: <http://venturebeat.com/2010/06/01/zoho-search/> on Aug. 20, 2010, (Jun. 1, 2010), 7 pages.
Kuchinskas, Susan "Meta Search for the Desktop", Retrieved from: <http://www.internetnews.com/ent-news/article.php/3468611/Meta-Search-For-The-Desktop.htm> on Aug. 20, 2010, (Feb. 4, 2005), 4 pages.
Lu, Wen-Hsiang et al., "LiveTrans: Translation Suggestion for Cross-Language Web Search from Web Anchor Texts and Search Results", In *Proceedings of Research on Computational Linguistics Conference XV*, Available at <http://www.aclweb.org/anthology-new/O/O03/O03-1004.pdf>,(2003), 16 pages.
Nguyen, Chuong "iPhone Nuance Dragon Search Searches Multiple Engines", Retrieved from: <http://pocketnow.com/software-1/iphone-nuance-dragon-search-searches-multiple-engines> on Aug. 20, 2010, (Dec. 18, 2009), 3 pages.
Paganelli, Laila et al., "Intelligent Analysis of User Interactions with Web Applications", In *Proceedings of International Conference on Intelligent User Interfaces*, Available at <http://giove.isti.cnr.it/projects/cameleon/pdf/iui02.pdf>,(Jan. 16, 2002), 8 pages.
Slawski, Bill "Predictive Search Query Suggestions", Retrieved from: <http://www.seobythesea.com/?p=1375> on Aug. 23, 2010 (May 8, 2009), 14 pages.
Srivastava, Utkarsh et al., "Query Optimization over Web Services", In *Proceedings of VLDB* 2006, Available at <http://infolab.stanford.edu/~usriv/papers/wsms.pdf>,(Sep. 15, 2006), 12 pages.
Tajima, Toshi "Your mobile and desktop search history now in sync" Retrieved from: <http://googlemobile.blogspot.com/2009/09/your-mobile-and-desktop-search-history.html> on Aug. 23, 2010, (Sep. 30, 2009), 2 pages.
Vallet, David et al., "Personalized Content Retrieval in Context Using Ontological Knowledge", *IEEE Transactions on Circuits and Systems for Video Technology*, vol. 17, No. 3, Available at <http://ieeexplore.ieee.org/xpl/freeabs_all.jsp?arnumber=4118247>,(Mar. 2007), pp. 336-346.
"Computer Software-Related Invention", In Examination Handbook for Patent and Utility Model in Japan, Annex B., Cited Date: Nov. 2, 2015, 174 Pages.
"Office Action Issued in Korean Patent Application No. 10-2014-7006409", dated Sep. 5, 2018, 10 Pages.
"Final Office Action Issued in U.S. Appl. No. 13/942,050", dated Jun. 1, 2018, 34 Pages.
"Final Office Action Issued in U.S. Appl. No. 13/942,050", dated Apr. 21, 2016, 24 Pages.
"Office Action Issued in Canadian Patent Application No. 2,816,332", dated May 23, 2018, 5 Pages.
"Office Action Issued in Canadian Patent Application No. 2,847,223", dated Jun. 15, 2018, 8 Pages.
"Office Action Issued in Mexican Patent Application No. MX/a/2014/002786", dated Feb. 1, 2018, 4 Pages.
"Office Action Issued in EP Patent Application No. 12829328.9", dated Dec. 7, 218, 16 pages.
"Notice of Allowance Issued in Korean Patent Application No. 10-2014-7006409", dated Feb. 28, 2019, 4 Pages.
"Office Action Issued in Canadian Patent Application No. 2,847,223", dated Mar. 11, 2019, 6 Pages.

\* cited by examiner

FACILITATING INTERACTION WITH SYSTEM LEVEL SEARCH USER INTERFACE

RELATED APPLICATIONS

This application is a continuation-in-part of U.S. patent application Ser. No. 12/947,292, filed Nov. 16, 2010, entitled "System Level Search User Interface" to Priya Vaidyanathan, et al., which is hereby incorporated by reference herein.

BACKGROUND

As computers have become increasingly commonplace, the amount of electronic data that has become available to users has grown tremendously. While having access to such large amounts of electronic data can be very beneficial to users, it is not without its problems. One such problem is that it remains difficult for users to find the particular electronic data that they are looking for. For example, users can encounter situations where they are accessing multiple different applications in order to find the particular electronic data they are looking for. This typically involves users requesting the different applications be executed, navigating to the search interfaces of the different applications, and entering the same search terms into each of the different applications. This can result in a cumbersome and frustrating experience for the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a character input is received at a computing device when a currently active application or component of the computing device does not support character inputs. In response to the character input, a system level search user interface is displayed including a data entry portion displaying the character as a search term.

In accordance with one or more aspects, a user input that is a keyboard shortcut is received at a computing device. In response to the user input, a system level search user interface is displayed having a first portion and a second portion. In the first portion a search term is displayed, and in the second portion identifiers of one or more scopes that can be searched using the search term are displayed.

BRIEF DESCRIPTION OF THE DRAWINGS

The same numbers are used throughout the drawings to reference like features.

DETAILED DESCRIPTION

Facilitating interaction with a system level search user interface is discussed herein. The system level search user interface (UI) provides a centralized UI that allows users to enter a search term and search for that search term in multiple different scopes, including multiple different applications. The particular applications that a user can search using the system level search UI register with the system level search UI, providing various information regarding the applications. The system level search UI uses this registration information to determine how these different applications are to be identified to the user, how the applications are to be launched, and so forth. A set of keyboard shortcuts allow users to quickly search using any of the scopes, and quickly see previews (e.g., counts) of results that each of the scopes return. Additionally, the system level search UI allows users to easily focus on different search result entries, and efficiently change scopes for searching.

Figure 1:
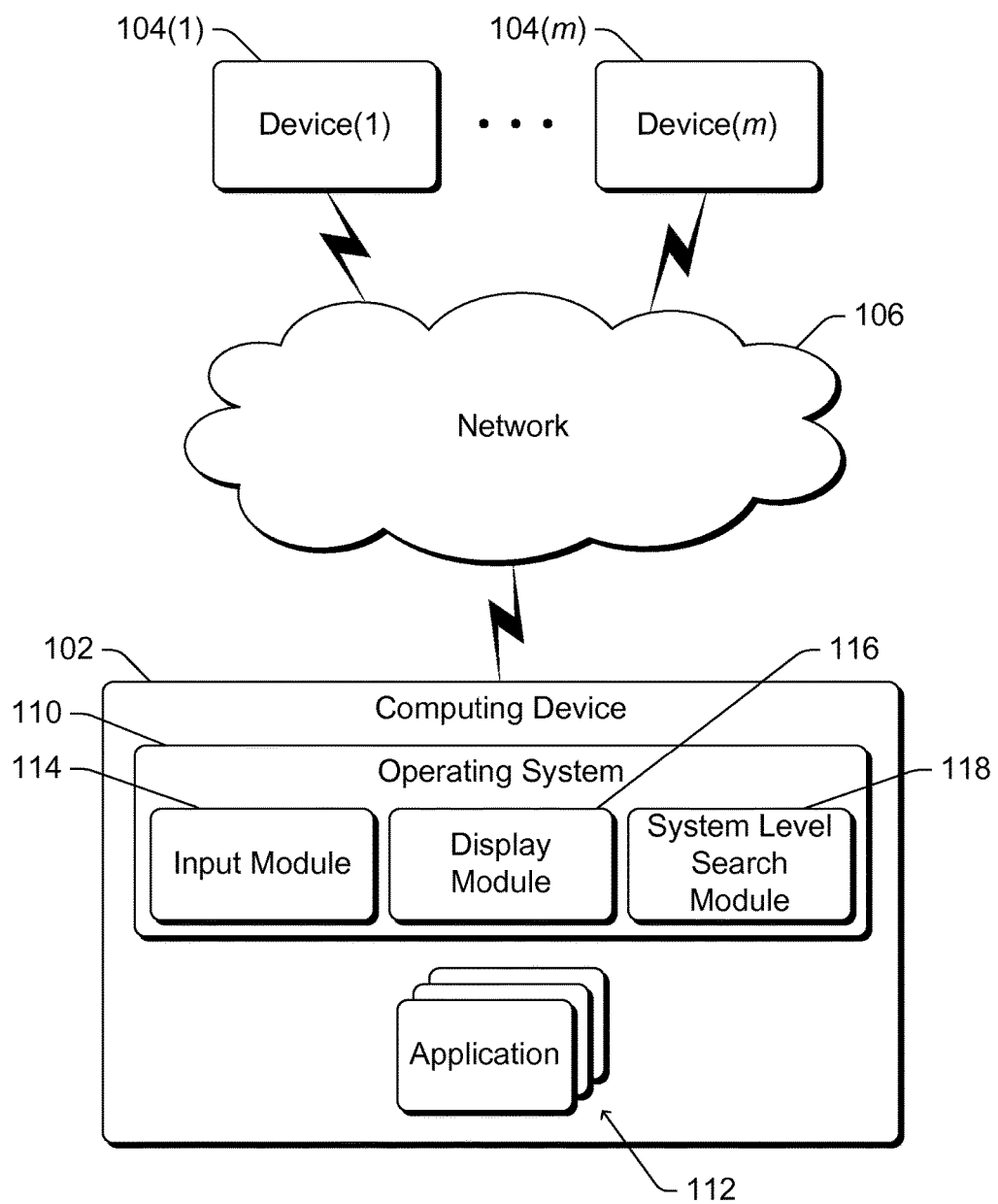
FIG. 1 illustrates an example system implementing the facilitating interaction with a system level search user interface in accordance with one or more embodiments.

FIG. 1 illustrates an example system 100 implementing the facilitating interaction with a system level search user interface in accordance with one or more embodiments. System 100 includes a computing device 102 that can optionally communicate with one or more (x) other devices 104(1), . . . , 104(m) via a network 106. Network 106 can be a variety of different networks, including the Internet, a local area network (LAN), a personal area network (PAN), a storage area network (SAN), a public telephone or other phone network, an intranet, other public and/or proprietary networks, combinations thereof, and so forth.

Computing device 102 can be a variety of different types of devices, such as a physical device or a virtual device. For example, computing device 102 can be a physical device such as a desktop computer, a notepad or tablet computer, a netbook or laptop computer, a server computer, a mobile station, an entertainment appliance, a set-top box communicatively coupled to a display device, a television or other display device, a cellular or other wireless phone, a game console, an automotive computer, and so forth. Computing device 102 can also be a virtual device, such as a virtual machine running on a physical device. A virtual machine can be run on any of a variety of different types of physical devices (e.g., any of the various types listed above). Additionally, although illustrated as a single device 102, it should be noted that the components or modules of computing device 102 can be implemented as a system of multiple devices, with the components or modules being distributed across the different devices in the system.

Devices 104 can be a variety of different computing devices capable of communicating with computing device 102. Computing device 102 can optionally access one or more of devices 104 to obtain various information, as discussed in more detail below. Similar to the discussion of computing device 102, devices 104 can be a variety of different types of devices. Devices 104 can be the same type or alternatively different types of devices as computing device 102. In system 100, computing device 102 is illustrated as communicating with devices 104 via network 106. Alternatively, computing device 102 can communicate with devices 104 via other types of communication mechanisms or connections, such as various wired and/or wireless connections (e.g., universal serial bus (USB) connections, wireless USB connections, Bluetooth connections, IEEE 1394 connections, and so forth).

Computing device 102 includes an operating system 110 and one or more applications 112. Operating system 110 manages the launching and running of applications 112 on computing device 102. Each of applications 112 can be a variety of different types of applications, such as productivity applications (e.g., email applications, word processing applications, spreadsheet applications, database applications, etc.), entertainment applications (e.g., game applications, audio and/or video playback applications, etc.), social networking applications, and so forth. An application 112 can access data locally, accessing data on computing device 102 (or on storage devices coupled to computing device 102) rather than accessing data on a device 104 via network 106. For example, an application 112 can be a word processing application that accesses data locally. In addition to, or alternatively in place of, accessing data locally, an application can access data on one or more devices 104 via network 106. For example, an application 112 can be an interface application for a device 104 that provides a movie service, allowing a user of computing device 102 to access movies from device 104 via that application 112.

Operating system 110 includes an input module 114, a display module 116, and a system level search module 118. Operating system 110 is typically implemented in software and/or firmware, although at least parts of operating system 110 can alternatively be implemented in hardware.

Input module 114 receives user inputs from a user of computing device 102. User inputs can be provided in a variety of different manners, such as by pressing one or more keys of a keypad or keyboard of device 102, pressing one or more keys of a controller (e.g., remote control device, mouse, trackpad, etc.) of device 102, pressing a particular portion of a touchpad or touchscreen of device 102, making a particular gesture on a touchpad or touchscreen of device 102, and/or making a particular gesture on a controller (e.g., remote control device, mouse, trackpad, etc.) of device 102. User inputs can also be provided via other physical feedback input to device 102, such as tapping any portion of device 102, an action that can be recognized by a motion detection component of device 102 (such as shaking device 102, rotating device 102, etc.), and so forth. User inputs can also be provided in other manners, such as via audible inputs to a microphone, via motions of hands or other body parts observed by an image capture device, and so forth. These user inputs allow a user to interact with computing device 102, such as by inputting particular characters or symbols, selecting particular buttons or menu options, dragging and dropping various descriptions or images, and so forth.

Display module 116 generates, manages, and/or outputs a display for a screen of computing device 102. This display can include various information, such as information provided by applications 112, information provided by system level search module 118 or other modules of operating system 110, and so forth. The information displayed to the user can include user inputs received by input module 114. The screen on which display module 116 displays information can be implemented in a variety of different manners, such as using liquid crystal display (LCD) technology, plasma screen technology, image projection technology, and so forth. The screen can be included as part of computing device 102, or alternatively display module 116 can generate one or more signals that are output to one or more other display devices that include one or more screens. Although the discussions herein refer to displaying information on one or more screens, it is to be appreciated that information can alternatively be presented to users by display module 116 in other manners, such as audibly.

System level search module 118 provides a system level search UI, which is a centralized UI that allows users of computing device 102 to enter a search term and search for that search term in different scopes. A scope refers to a type of content or content source, and searching for a search term in a scope refers to searching for a search term in a particular type of content or content source. In one or more embodiments, system level search module 118 supports scopes of files, settings, applications, and application-specific. However, it should be noted that scopes of files, settings, applications, and application-specific are examples of scopes, and that system level search module 118 can support any number of scopes. For example, module 118 may alternatively support only a subset of the files, settings, applications, and application-specific scopes. By way of another example, module 118 may support one or more additional scopes in place of and/or in addition to one or more of the files, settings, applications, and application-specific scopes.

The files scope refers to files stored on a storage device used by computing device 102. Such storage devices can be included as part of computing device 102 (e.g., internal hard disks or Flash memory devices), can be removably coupled to computing device 102 (e.g., removable Flash memory devices or optical discs), can be accessed over a network (e.g., network 106), and so forth. Searching for a search term in the files scope refers to searching for files stored on computing device 102 that include the search term (e.g., the search term is in the name of the file, in metadata of the file, in the content of the file itself, and so forth), and search results identifying those files can be returned. Searching for a search term in the files scope can refer to searching all folders on all storage devices used by computing device 102, or alternatively searching only selected folders and/or storage devices used by computing device 102.

The settings scope refers to controls for various configuration settings, such as configuration settings of computing device 102, configuration settings of one or more applications 112, configuration settings of other devices (e.g., one or more devices 104 or other devices coupled to computing device 102), and so forth. Searching for a search term in the settings scope refers to searching for configuration setting controls (e.g., components, programs, etc.) that include the search term (e.g., the search term is in the name of the control, in metadata of the control, and so forth), and search results identifying those configuration setting controls can be returned.

The applications scope refers to applications 112. Searching for a search term in the applications scope refers to searching for applications 112 that include the search term (e.g., the search term is in the name of the application 112, in metadata of the application 112, and so forth), and search results identifying those applications 112 can be returned.

The application-specific scope refers to a particular application 112 that can generate search results. Searching for a search term in an application-specific scope refers to a specific application 112 searching for the search term (in whatever manner the specific application 112 desires), and providing search results (in whatever manner the specific application 112 desires). The particular ones of applications 112 that can generate search results are those applications 112 that have registered with system level search module 118, as discussed in more detail below The search term can be any combination of letters, characters, symbols, and so forth, such as one or more words, a portion of a word, and so forth. The system level search UI includes a data entry portion via which the user can input the search term, and a search identification portion via which different scopes can be identified.

The system level search UI provided by system level search module 118 allows the user of computing device 102 to input his or her desired search term once in the centralized UI, and then select one or more different scopes to search for that search term. In response to selecting a scope via the system level search UI, the selected scope is searched for the search term (providing the search term to a module or application to perform the searching as appropriate), and search results based on that search term are displayed (via display module 116). The user can have different scopes searched for that same search term simply by selecting the scopes via the system level search UI. Thus for example, rather than the user interacting with operating system 110 to request execution of different applications 112, navigating to a search interface of each of those different applications 112, and entering the same search term into each of those different applications, the user can enter the search term a single time into the system level search UI. The user can then select (e.g., via a single user input such as a keystroke, tapping an application identifier on a touchscreen, clicking on an application identifier when a pointer or other cursor is over the application identifier, etc.) one or more of the applications 112, relying on operating system 110 to automatically execute those applications 112 when selected, and relying on system level search module 118 to provide the search term to the selected applications 112.

A search term entered by a user can be searched for at different times. In one or more embodiments, in response to receiving a search term, system level search module 118 (or alternatively another module of operating system 110) searches the different scopes for the search term and generates search results. Module 118 need not wait for a specific scope to be selected by a user before generating search results for the scope based on the search term. Module 118 can also optionally provide, in response to receiving the search term, the search term to applications 112. Applications 112 thus also need not wait for a specific application 112 to be selected before generating search results based on the search term. Although search results for scopes may be generated in response to receiving the search term, these search results may not be displayed (e.g., if search results from an application 112 or other scope are not requested by the user, then the search results generated for that application 112 or other scope would not typically be displayed).

Alternatively, the search term may not be searched for until a user request to search for the search term is received (e.g., user selection of a "search" button, user selection of a scope, and so forth). Thus, in such situations, system level search module 118 does not provide the search term to an application 112 or otherwise search a scope for the search term until a user request to search for the search term in that scope is received. A combination of these can also be used. For example, system level search module 118 (or alternatively another module of operating system 110) can search particular scopes for the search term and generate search results in response to receiving a search term, but not provide the search term to an application 112 until the user requests to search that particular application 112 (e.g., by selecting an identifier of that particular application 112 in a system level search UI as discussed in more detail below).

The system level search UI can be activated at different times. When the system level search UI is activated, the system level search UI is displayed by display module 116. System level search module 118 can keep the system level search UI activated and constantly displayed. Alternatively, system level search module 118 can activate the system level search UI in response to a particular request (e.g., a user input of a particular keyboard shortcut, a user request to perform a search, a request from an application 112 to perform a search, and so forth), keeping the system level search UI hidden until activated. Applications 112 can leverage the system level search UI, invoking system level search module 118 or directing the user to the system level search UI already displayed by module 118. Applications 112 need not provide their own search user interfaces, as they can rely on the system level search UI.

Thus, it should be noted that the system level search UI can be used in different manners. A user can enter a search term into the system level search UI and then select, via the system level search UI, one or more scopes to search for that search term. Alternatively, a user can enter a request via an application 112 or other module that searches a scope to enter a search term. In response, the system level search UI can be displayed (or the user can be directed to the system level search UI that is already displayed), via which the user can enter his or her search term to search that application 112. Alternatively, a user can select one or more applications 112 without entering a search term, in response to which the selected application is notified of the user selection and the selected application displays its search results display view. Search results may not be displayed by the selected application yet because the user has not yet entered a search term. However, after entry of a search term, the selected application would display its search results.

Figure 2:
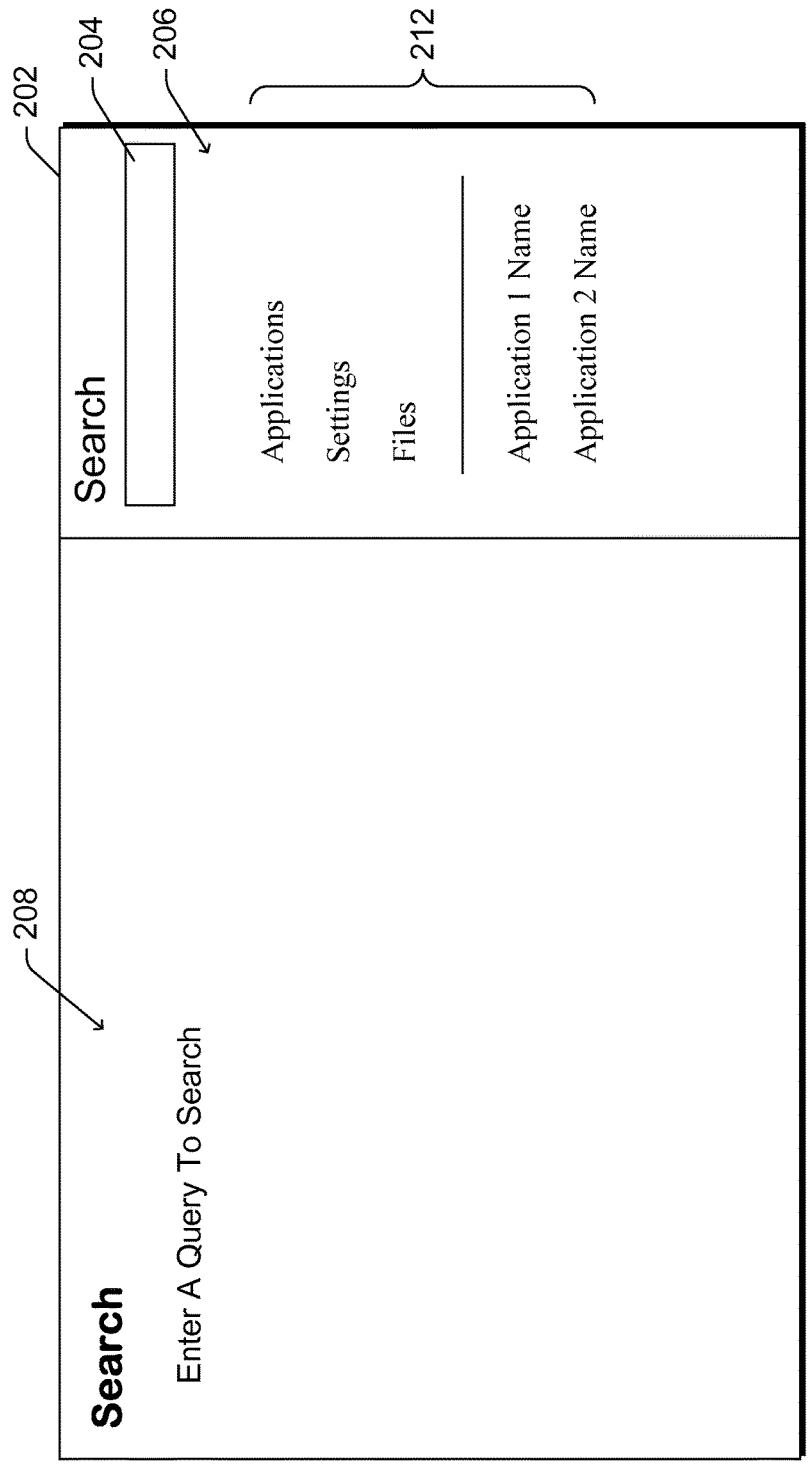
FIGS. 2, 3, 4, 5, and 6 illustrate example screen displays including a system level search user interface in accordance with one or more embodiments.

FIG. 2 illustrates an example screen display 202 including a system level search user interface in accordance with one or more embodiments. The system level search UI is illustrated including three portions: a data entry portion 204, a search identification portion 206, and a search results portion 208. The user can enter various words, letters, symbols, characters, and so forth as search terms (e.g., via input module 114 of FIG. 1 as discussed above). This user input is displayed in data entry portion 204. In the illustrated example, the user has not entered any characters in data entry portion 204. Accordingly, search results portion 208 displays no search results, and provides an indication to the user to enter a query to search.

Search identification portion includes scope identifiers 212. Scope identifiers 212 include identifiers of various scopes that the user can select to search for the search term entered in data entry portion 204. In the illustrated example, scope identifiers 212 include identifiers of the applications scope, the settings scope, the files scope, and two application-specific scopes (for applications identified as "Application 1 Name", and "Application 2 Name"). These application-specific scope identifiers are also referred to as application identifiers, and by displaying identifiers of application-specific scopes search identification portion 206 is also referred to as displaying the applications identified by those identifiers. The user can select one of scope identifiers 212 in a variety of different manners (e.g., via input module 114 of FIG. 1), such as touching a scope identifier with a stylus or finger, maneuvering a pointer over the scope identifier and pressing a button of a cursor control device (e.g., a mouse), changing which scope identifier is focused on using keyboard arrow keys and pressing enter when a desired scope identifier is focused on, and so forth.

Screen display 202 illustrates scope identifiers 212 as being text identifiers (e.g., names), although identifiers 212 can take different forms. For example, identifiers 212 can include icons or symbols representing scopes and/or applications in addition to (or in place of) the scope and/or application text identifiers. These icons or symbols can be selected by the user analogous to selection of the text identifiers discussed above.

It should be noted that the locations of data entry portion 204, search identification portion 206, and search results portion 208 of the system level search UI illustrated in the Figures are examples, and that the system level search UI can be displayed anywhere on screen display 202. For example, data entry portion 204 and search identification portion 206 can be displayed at the top or bottom of screen display 202, along the left side of screen display 202, in the center of screen display 202, as part of a menu bar or window, as part of an icon bar or dock, and so forth. By way of another example, search results portion 208 can be displayed at the top or bottom of screen display 202, along the right side of screen display 202, in the center of screen display 202, as part of a menu bar or window, as part of an icon bar or dock, and so forth.

In the example of FIG. 2, no scope has been selected. Accordingly, screen display 202 can also be referred to as simply a search UI or a universal search UI. Other screen displays can be displayed when a scope has been selected, such as an applications scope search UI (discussed below with reference to FIG. 3), a settings scope search UI (discussed below with reference to FIG. 4), a files scope search UI (discussed below with reference to FIG. 5), and an application-specific scope search UI (discussed below with reference to FIG. 6).

Alternatively, rather than displaying screen display 202 with no search results in search results portion 208, search results for a default scope can be displayed in search results portion 208. The default scope can be a currently active application (the currently active application is discussed in more detail below), or alternatively any other scope.

Figure 3:
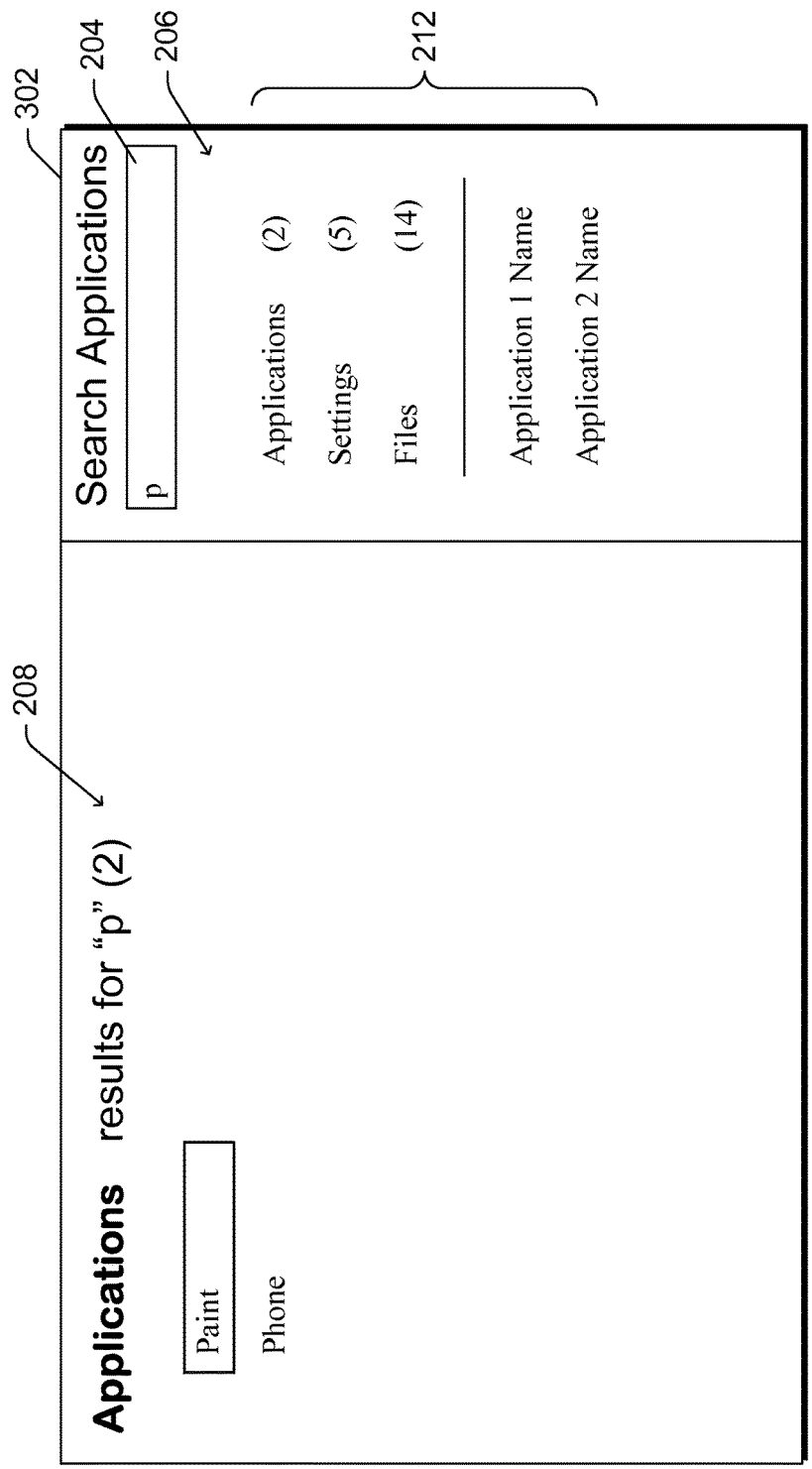

FIG. 3 illustrates another example screen display 302 including a system level search user interface in accordance with one or more embodiments. Screen display 302 is similar to screen display 202 of FIG. 2. However, screen display 302 shows the system level search user interface with the applications scope having been selected (e.g., by user selection of the "Applications" scope identifier 212, by user entry of a keyboard shortcut as discussed below, and so forth). Additionally, screen display 302 shows the search term "p" having been entered in data entry portion 204. At the point in time that screen display 302 illustrates, "p" is the search term, although it should be noted that the user can continue to enter additional characters resulting in different search terms.

In response to the applications scope having been selected, search results for the search term in data entry portion 204 for the applications scope are displayed in search results portion 208. In the illustrated example of FIG. 3, two applications on the computing device include the search term, an application named "Paint" and an application named "Phone", and identifiers of these applications are displayed in search results portion 208. As illustrated, search results portion 208 can also include an indication that the scope is "Applications" and an indication of the search term, and an indication that the scope is "Applications" can be provided in close proximity to (e.g., above) data entry portion 204.

It should be noted that situations can arise where the search results include more entries than can be displayed at one time in search results portion 208. In such situations, the user can scroll through the entries using any of a variety of different user inputs, such as moving a bar, scroller, button, etc. of a scrollbar, dragging a finger or making another gesture on a screen, and so forth.

Additionally, in situations in which search results are generated for the different scopes in response to receiving the search term, screen display 302 can include an indication of how many entries the search results include for the different scopes. The nature of each entry can vary based on the scope. A preview of the results for different scopes (e.g., counts of how many entries are included in the search results for the scope) can also be displayed. In the illustrated example of FIG. 3, an indication "(2)" adjacent to the applications scope identifier 212 is used to indicate that the search results for the applications scope includes two entries (e.g., two applications). Similarly, an indication "(5)" adjacent to the settings scope identifier 212 is used to indicate that the search results for the settings scope includes five entries (e.g., five configuration setting controls), and an indication "(14)" adjacent to the files scope identifier 212 is used to indicate that the search results for the files scope includes 14 entries (e.g., 14 files). Additionally, because the applications scope has been selected, the indication "(2)" is displayed in search results portion 208 (in addition to or in place of the indication "(2)" in search identification portion 206) to indicate that the search results for the applications scope includes two entries (e.g., two applications). Although not illustrated, an indication of the number of search results for the application-specific scopes can also optionally be included adjacent to the application-specific scope identifiers 212.

Although search results portion 208 displays search results for the applications scope, the user can select any of the other scope identifiers 212. In response to selection of any of the other scope identifiers 212, search results for the selected identified scope are displayed in search results portion 208. The user can select one of scope identifiers 212 in a variety of different manners (e.g., via input module 114 of FIG. 1), such as by touching a scope identifier with a stylus or finger, maneuvering a pointer over the scope identifier and pressing a button of a cursor control device (e.g., a mouse), changing which scope identifier is focused on using keyboard arrow keys and pressing enter when a desired scope identifier is focused on, and so forth.

In one or more embodiments, screen display 302 also focuses on a particular entry (e.g., the first entry) in search results portion 208. Focusing can be performed in different manners, such as by surrounding an entry with a box, highlighting an entry, altering the font or color of an entry, and so forth. Similarly, other identifiers (e.g., scope identifiers 212) can also be focused on in different manners. The user can change which entry in search results portion 208 is focused on by pressing keyboard arrow keys, and select a particular entry by pressing a keyboard enter key. Various actions can be taken in response to selecting an entry, and those actions are based at least in part on the scope for which the search results were generated. For example, in response to selecting an entry, an application or control identified by the entry can be run, a file identified by the entry can be opened, additional information identified by the entry can be displayed, and so forth.

It should be noted that the particular entry in search results portion 208 is automatically focused on in response to the system level search UI of screen display 302 being displayed and a search term being entered. The user need take no additional actions to have the particular entry focused on (e.g., the user need not make any selection of search results portion 208). Alternatively, rather than automatically focusing on a particular entry in search results portion 208, focus can be automatically placed elsewhere (e.g., on a particular scope identifier 212).

Generally, if search results are included for a selected scope, then by default keyboard arrow key selections are used to control which entry in the search results portion is focused on, and character (e.g., alphanumeric, symbol, etc.) key selections are used to input at least part of the search term displayed in the data entry portion. A user can switch which portion the keyboard arrow key selections control using a keyboard tab key to toggle between, for example, the search results portion and the search identification portion. When controlling the search identification portion, the keyboard arrow key selections control which identifier of the scope identifiers is focused on. However, if search results are not included for a selected scope, then by default keyboard arrow key selections are used to control which identifier in the search identification portion is focused on, and character (e.g., alphanumeric, symbol, etc.) key selections are used to input at least part of the search term displayed in data entry portion 204. Thus, if search results are not included for a selected scope, then arrow keys are automatically used to change focus on identifiers in the search identification portion—the user need take no additional action to tab to or otherwise select the search identification portion in order to have the arrow keys be used to change focus on identifiers in the search identification portion.

For example, a user can press a down arrow key on a keyboard to change the entry focused on to the next entry below the currently focused on entry in search results portion 208, can press an up arrow key on a keyboard to change the entry focused on to the next entry above the currently focused on entry in search results portion 208, can press a right arrow key on a keyboard to change the entry focused on to the next entry to the right of the currently focused on entry in search results portion 208, and can press a left arrow key on a keyboard to change the entry focused on to the next entry to the left of the currently focused on entry in search results portion 208. The user can also press the tab key on the keyboard to similarly use the up, down, left, and/or right arrow keys on the keyboard to change which of identifiers 212 are focused on.

Thus, a user can quickly and easily maneuver through search results and select the entry that he or she desires. For example, when the selects to search the applications scope and enters the search term "p", the first application "Paint" is automatically focused on in search results portion 208. The user can easily run the "Paint" application by simply pressing the enter key on the keyboard—the user need take no additional action to tab to or otherwise select search results portion 208 in order to have the "Paint" application focused on. Alternatively, the user can easily select another entry by using the arrow keys of the keyboard to have another entry focused on, and pressing the enter key to have the application identified by that other entry run. The arrow keys are automatically used, by default, to change focus on the search results—the user need take no additional action to tab to or otherwise select search results portion 208 in order to have the arrow keys be used to change focus on entries in search results portion 208. If the user desires to select a different scope or application for the search term, the user can simply press the tab key to toggle to the search identification portion, and then use the arrow keys of the keyboard to have different scope identifiers focused on.

Alternatively, the keys of the keyboard that are used to control which entry in the search results portion is focused on can be different than the keys of the keyboard that are used to control which identifier of the scope identifiers is focused on. For example, arrow keys can be used to control which entry in the search results portion is focused on, and number keys can be used to control which identifier of the scope identifiers is focused on.

In one or more embodiments, as different scope identifiers 212 are focused on, the focusing on the identifiers 212 is treated as a selection of the identifier. Accordingly, search results for the focused on identifier are displayed in search results portion 208. Alternatively, an additional action may be taken in order for a focused on identifier to be treated as selected, and focusing on an identifier without this additional action is not treated as the identifier being selected. For example, an identifier can be selected by the user pressing the enter key (or alternatively another key or user input) when the identifier is focused on.

It should be noted that FIG. 3 illustrates an example where the user has entered the search term "p". Each one or more characters or symbols input by the user is treated as a search term, so if the user were to enter next enter the letter "a", then the search term would become "pa", and the search results portion 208 would include search results for the search term "pa". A new search term is created each time the user enters a character or symbol, or deletes a character or symbol. Alternatively, a search term may not be entered until the user indicates he or she has completed entering the search term. For example, a user may enter multiple characters or symbols, but those characters are not treated as a search term until the user enters a "search" button or other indication that he or she has completed entering the search term.

Figure 4:
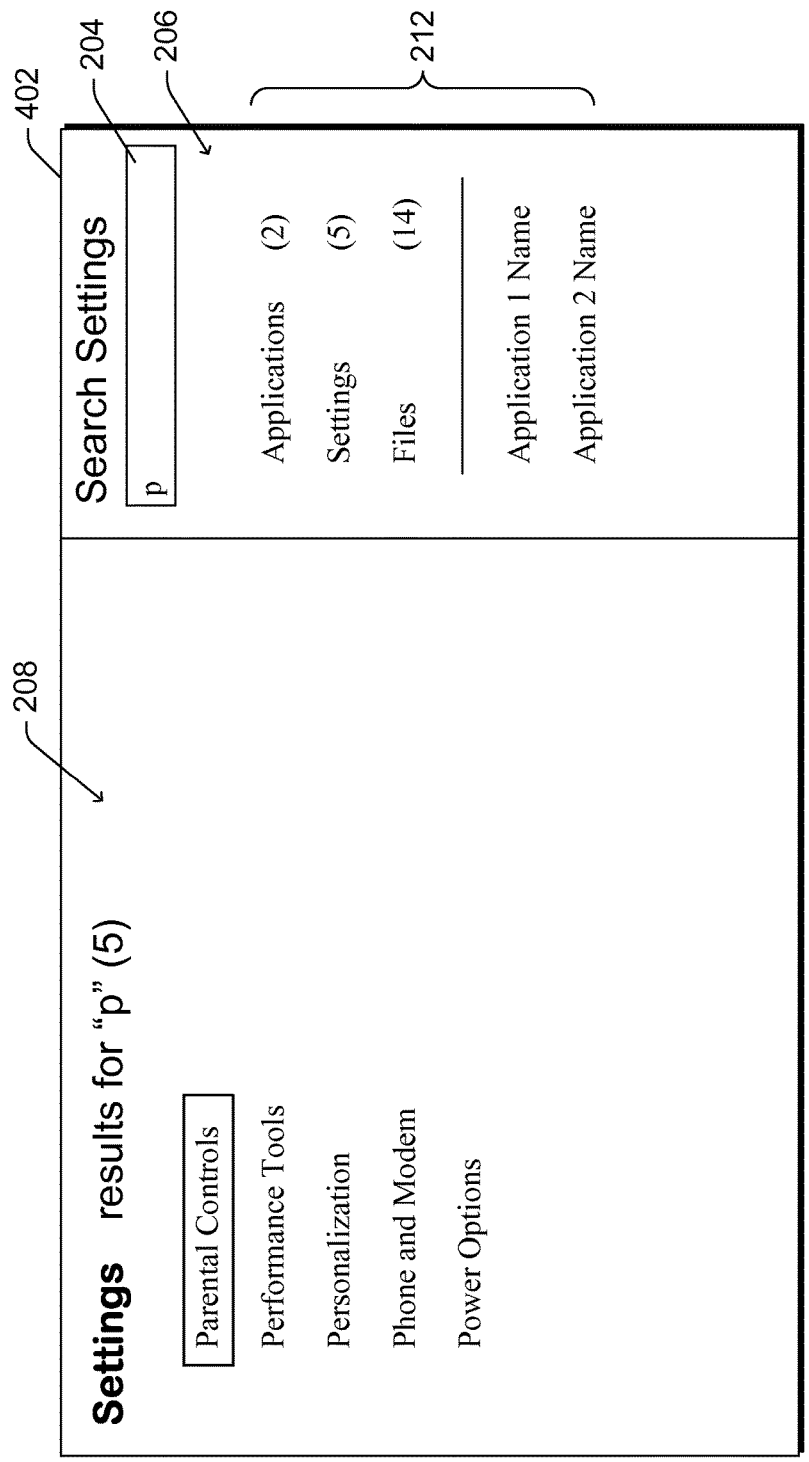

FIG. 4 illustrates another example screen display 402 including a system level search user interface in accordance with one or more embodiments. Screen display 402 is similar to screen display 302 of FIG. 3. However, screen display 402 shows the system level search user interface with the settings scope having been selected (e.g., by user selection of the "Settings" scope identifier 212, by user entry of a keyboard shortcut as discussed below, and so forth).

In response to the settings scope having been selected, search results for the search term in data entry portion 204 for the settings scope are displayed in search results portion 208. In the illustrated example of FIG. 4, five configuration setting controls on the computing device include the search term, and identifiers of these controls are displayed in search results portion 208 as "Parental Controls", "Performance Tools", "Personalization", "Phone and Modem", and "Power Options". As illustrated, search results portion 208 can also include an indication that the scope is "Settings" and an indication of the search term, and an indication that the scope is "Settings" can be provided in close proximity to (e.g., above) data entry portion 204.

The user can interact with the system level search user interface illustrated in FIG. 4 as discussed above with respect to FIGS. 2 and 3. For example, the first entry ("Parental Controls") in search results portion 208 is automatically focused on and can be selected by the user pressing the enter key of a keyboard, the user can change which entry in search results portion 208 is focused on using arrow keys of the keyboard without having to take any additional action to select search results portion 208, the user can select a different scope identifier 212, and so forth.

Figure 5:
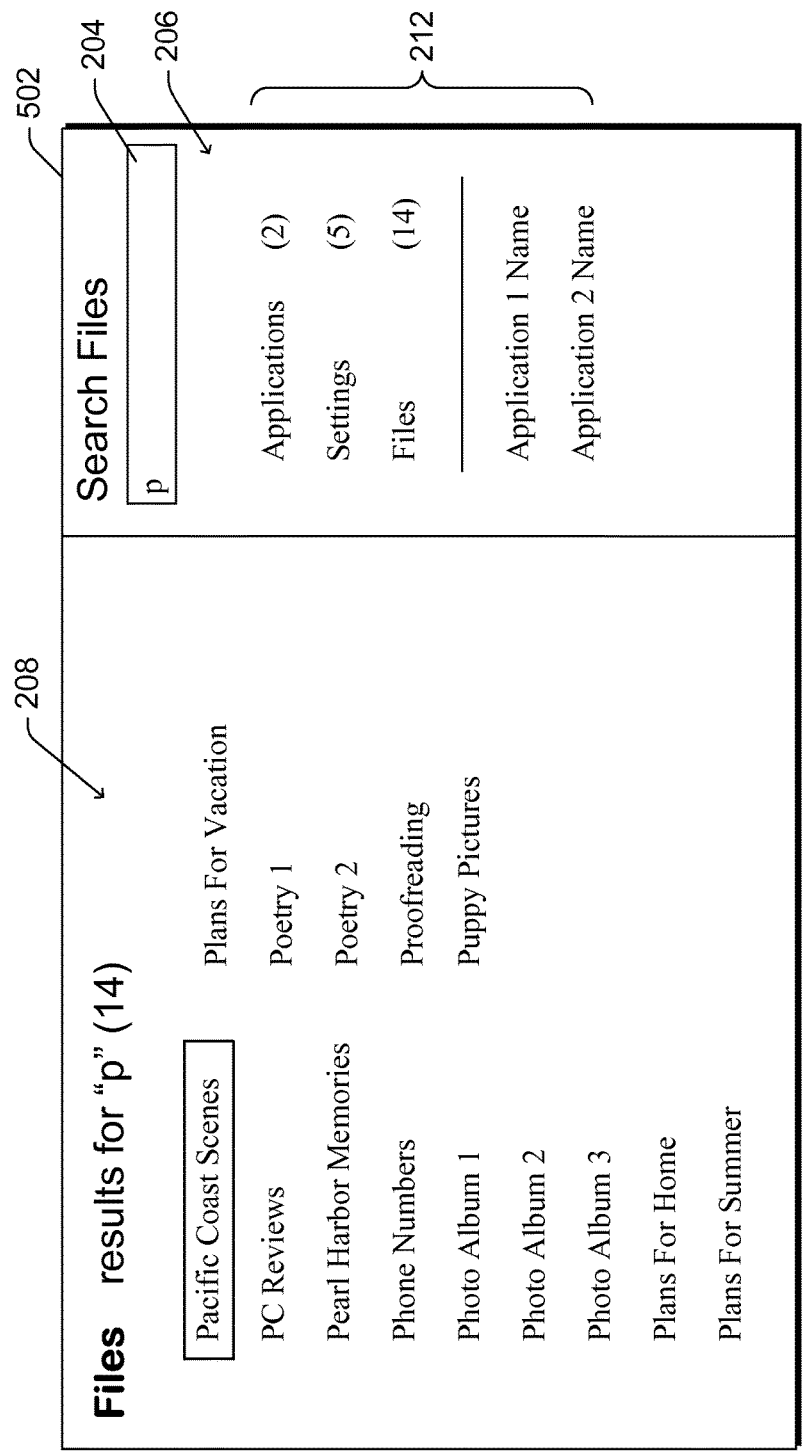

FIG. 5 illustrates another example screen display 502 including a system level search user interface in accordance with one or more embodiments. Screen display 502 is similar to screen display 302 of FIG. 3. However, screen display 502 shows the system level search user interface with the files scope having been selected (e.g., by user selection of the "Settings" scope identifier 212, by user entry of a keyboard shortcut as discussed below, and so forth).

In response to the files scope having been selected, search results for the search term in data entry portion 204 for the files scope are displayed in search results portion 208. In the illustrated example of FIG. 5, fourteen files on the computing device include the search term, and identifiers of these files are displayed in search results portion 208 as "Pacific Coast Scenes", "PC Reviews", "Pearl Harbor Memories", and so forth. As illustrated, search results portion 208 can also include an indication that the scope is "Files" and an indication of the search term, and an indication that the scope is "Files" can be provided in close proximity to (e.g., above) data entry portion 204.

The user can interact with the system level search user interface illustrated in FIG. 5 as discussed above with respect to FIGS. 2 and 3. For example, the first entry ("Pacific Coast Scenes") in search results portion 208 is automatically focused on and can be selected by the user pressing the enter key of a keyboard, the user can change which entry in search results portion 208 is focused on using arrow keys of the keyboard without having to take any additional action to select search results portion 208, the user can select a different scope identifier 212, and so forth.

Figure 6:
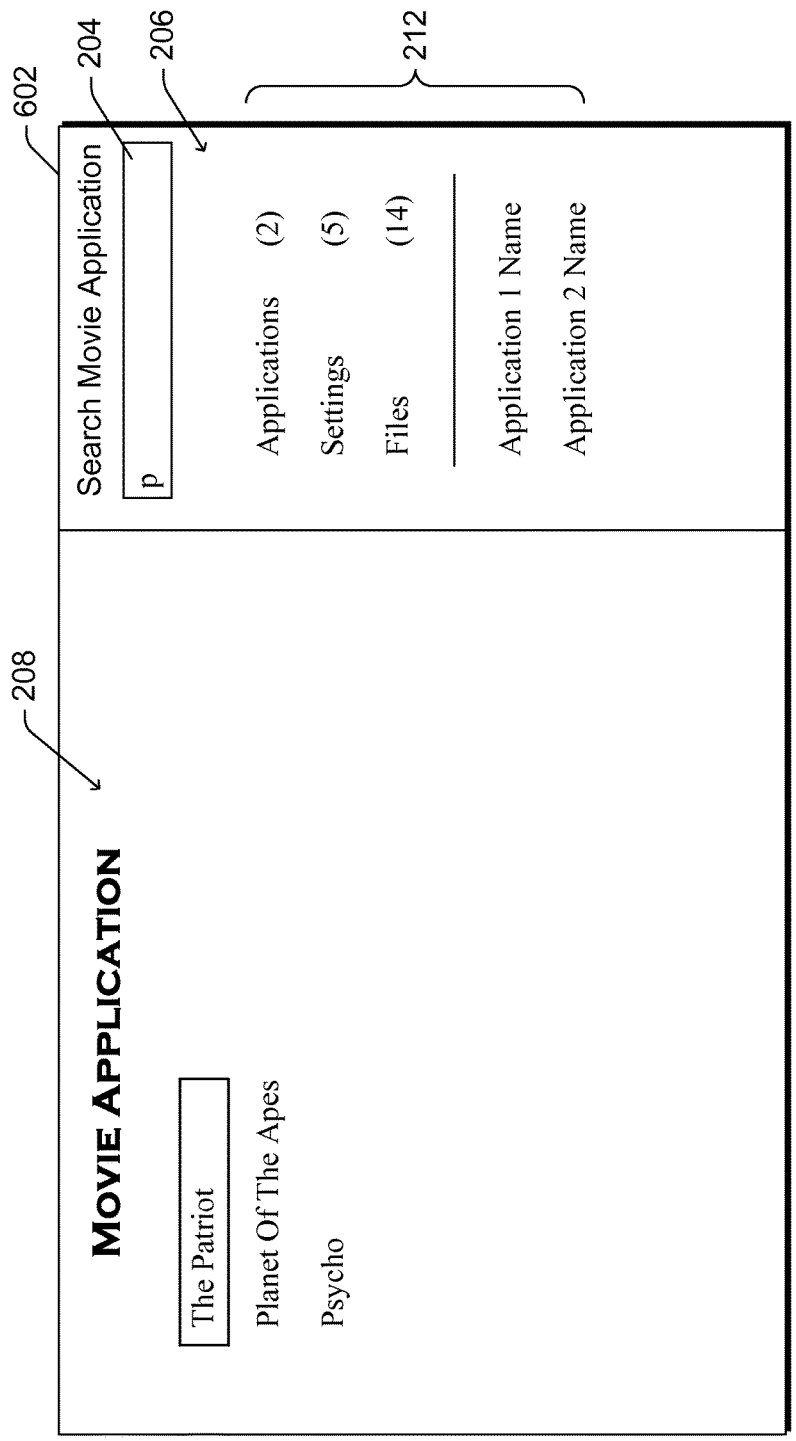

FIG. 6 illustrates another example screen display 602 including a system level search user interface in accordance with one or more embodiments. Screen display 602 is similar to screen display 302 of FIG. 3. However, screen display 602 shows the system level search user interface with an application-specific scope identifier 212 having been selected (e.g., by user selection of the "Application 1 Name" scope identifier 212, by user entry of a keyboard shortcut as discussed below, and so forth). In the illustrated example of FIG. 6, the selected application is a movie application.

In response to an application-specific scope identifier having been selected, search results for the search term in data entry portion 204 for the selected identified application are displayed in search results portion 208. The selected application determines what items include the search term, and generates the search results and display for search results portion 208. In the illustrated example of FIG. 6, three movies of the movie application include the search term, and identifiers of these movies are displayed in search results portion 208 as "The Patriot", "Planet of the Apes", and "Psycho". As illustrated, search results portion 208 can also include an indication of the selected application (e.g., by displaying the name of the application, such as "Movie Application", icon or symbol representing the application, etc.), and an indication of the selected application can be provided in close proximity to (e.g., above) data entry portion 204. Although not illustrated, an indication of the number of search results for the selected application (e.g., "(3)") can also optionally be included in search results portion 208 and/or adjacent to the application-specific scope identifier 212 for the selected application.

The user can interact with the system level search user interface illustrated in FIG. 6 as discussed above with respect to FIGS. 2 and 3. For example, the first entry ("The Patriot") in search results portion 208 is automatically focused on and can be selected by the user pressing the enter key of a keyboard, the user can change which entry in search results portion 208 is focused on using arrow keys of the keyboard without having to take any additional action to select search results portion 208, the user can select a different scope identifier 212, and so forth.

Although particular information displayed and user interactions with the system level search user interface are discussed above in FIGS. 2-6, it should be noted that various other information can be displayed and/or other user interactions supported. For example, the system level search module can obtain and display additional search terms, such as by obtaining type ahead results (e.g., one or more suggested additional search terms based on the search term entered in data entry portion 204), by obtaining characters for one or more additional languages (e.g., using an input method editor), and so forth. These additional search terms can be generated based on the search term and/or other user inputs, and can be generated by the system level search module, by another component or module of the operating system, by an application identified by an application-specific scope identifier 212, and so forth. When controlling the search identification portion, the keyboard arrow key selections can control which of these additional search terms are focused on. If the user navigates off of the additional search terms (e.g., by pressing the down arrow key when the last additional search term is focused on, or by pressing the up arrow key when the first additional search term is focused on), then the keyboard arrow key selections control which identifier in the search identification portion is focused on.

Various modifications to the search term can also optionally be made. The user can enter new characters resulting in new search terms as discussed above. Additionally, the search term can include various other terms or symbols (e.g., different operators, filters, wildcard values, etc.) based on various query syntaxes (such as the Advanced Query Syntax (AQS)). These terms or symbols can be input and displayed in data entry portion 204 or elsewhere (e.g., in an additional window or data entry portion, in search results portion 208, etc.). For example, in response to selection of an application-specific scope identifier 212 by the user, an additional window or data entry portion can be displayed (e.g., by the system level search module or by the application identified by the selected application-specific scope identifier 212) allowing the user to enter such various other terms or symbols. By way of another example, in response to selection of an application-specific scope identifier 212 by the user, a query modifier allowing input of such various other terms or symbols can be focused on in search results portion 208 rather than a particular entry of the search results.

Returning to FIG. 1, in one or more embodiments system level search module 118 supports various keyboard shortcuts, allowing a particular key sequence or group of any number of keys to be pressed by the user to cause a particular system level search UI to be displayed. These keyboard shortcuts can be defined in different manners, such as being pre-defined, user-defined, application-defined, and so forth.

Different keyboard shortcuts can be associated with different scopes. For example, one keyboard shortcut key (e.g., a combination of an operating system key and the Q key) can be associated with a universal search UI, another keyboard shortcut key (e.g., an operating system key alone) can be associated with an applications scope search UI, another keyboard shortcut key (e.g., a combination of an operating system key and the W key) can be associated with a settings scope search UI, and another keyboard shortcut key (e.g., a combination of an operating system key and the F key) can be associated with a files scope search UI. Although specific keyboard shortcut keys are discussed, it should be noted that any of a variety of other keyboard shortcut keys could be used.

Additional keyboard shortcut keys can also optionally be added. For example, keyboard shortcut keys for specific applications (e.g., applications identified by application-specific scope identifiers 212 of FIGS. 2-6) can be supported by system level search module 118. Such additional keyboard shortcut keys can be specified in different manners, such as by a user of computing device 102, by an application 112 (e.g., as part of registering with the system level search UI), and so forth.

In response to a particular keyboard shortcut key being entered, system level search module 118 displays the associated search UI. For example, if the user enters the keyboard shortcut associated with the files scope search UI, then the files scope search UI (e.g., screen display 502 of FIG. 5) is displayed. The user can, immediately after entering the keyboard shortcut key, begin entering the characters he or she desires for the search term for searching files on computing device 102.

In one or more embodiments, in response to the user entering the keyboard shortcut key associated with the universal search UI, system level search module 118 treats the user input as a request to display a search UI with a particular application having been selected. Accordingly, module 118 displays the system level search user interface as if the particular application had been selected (e.g., screen display 602 of FIG. 6). This particular application can be identified in different manners. For example, if the currently active application (e.g., an application currently running in the foreground and that the user can interact with) has registered with the system level search UI, then the particular application is the currently active application. However, if the currently active application has not registered with the system level search UI, then the particular application is identified in other manners, such as being a most frequently used application that has registered with the system level search UI, being a most recently used application that has registered with the system level search UI, and so forth.

Additionally, in one or more embodiments, operating system 110 is aware of the particular application 112 or component of operating system 110 that is the currently active application or component (e.g., the application or component that is currently running in the foreground and that the user can interact with). Typically, a single application or component is the currently active application or component at any given time, although the currently active application or component can change over time. Operating system 110 is also aware of whether the currently active application or component supports character (e.g., alphanumeric characters or other symbols) inputs. For example, an operating system menu may support arrow and/or other navigation keys as inputs, but not letter (character) keys. Operating system 110 can be made aware of whether the currently active application or component supports character inputs in various manners, such as due to the component being part of operating system 110, an indication being provided by an application 112 when the application 112 registers with the system level search UI, and so forth.

If a character input is received when the currently active application or component does not support character inputs, system level search module 118 displays the system level search UI. In one or more embodiments, module 118 treats a character input received when the currently active application or component does not support character inputs as a request to display the universal search UI, analogous to the user having selected the keyboard shortcut key associated with the universal search UI (as a request to display a search UI with a particular application having been selected as discussed above).

Alternatively, rather than the universal search UI, module 118 can treat a character input received when the currently active application or component does not support character inputs as a request to display search results for a different scope. The scope for which search results are displayed can be determined in different manners, such as based on a count of how many entries are included in the search results for the different scopes (e.g., display search results for the scope having the largest number of entries in its search results) or other relevance information. The scope for which search results are displayed can also be based on types of content (e.g., if the currently active application is a video playback application, then search results for a scope that has been defined as being the scope for video content can be the scope for which search results are displayed).

Figure 7:
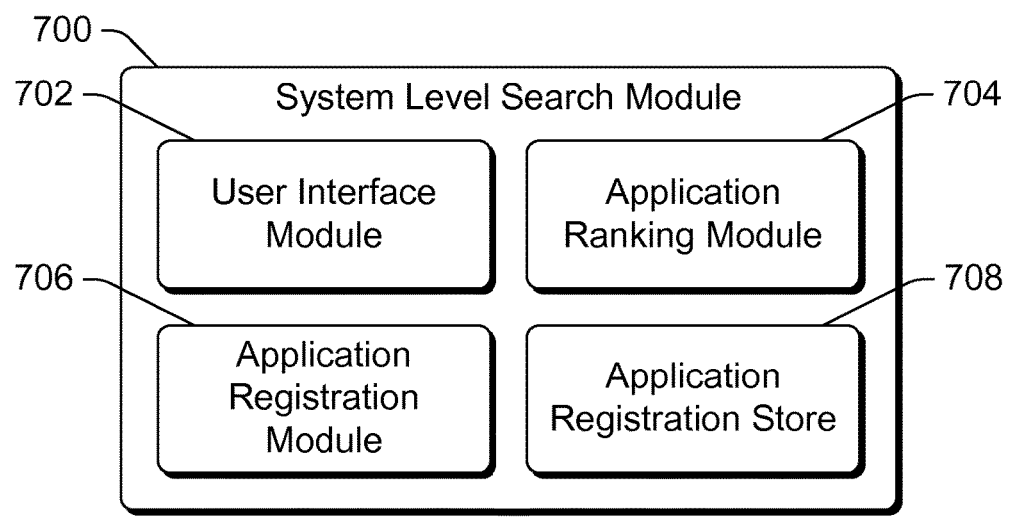
FIG. 7 is a block diagram illustrating an example system level search module in accordance with one or more embodiments.

FIG. 7 is a block diagram illustrating an example system level search module 700 in accordance with one or more embodiments. System level search module 700 can be, for example, a system level search module 118 of FIG. 1. System level search module 700 includes a user interface module 702, an application ranking module 704, an application registration module 706, and an application registration store 708.

Application registration module 706 manages the registration of applications with system level search module 700, allowing the registered applications to be displayed as application-specific scopes in the search identification portion of the system level search UI. This registration is also referred to as allowing the registered applications to use the system level search UI. Information regarding the registered applications is maintained in application registration store 708. Application ranking module 704 determines a ranking for registered applications, and the registered applications are displayed in the search identification portion of the system level search UI in accordance with their rankings. User interface module 702 generates the information to be displayed as the system level search UI, and provides that information to a display module of the computing device on which system level search module 700 is located (e.g., to display module 116 of FIG. 1). UI module 702 also interacts with applications (e.g., applications 112 of FIG. 1), including launching user-selected applications, communicating search terms to applications, and receiving information from applications to be displayed as part of the system level search UI.

In order to be displayed in the search identification portion of the system level search UI, an application registers with system level search module 700. Application registration module 706 manages the registration process for system level search module 700, communicating with the application and saving the appropriate registration information in application registration store 708. An application can be registered with system level search module 700 at different times, such as when the application is installed on the same computing device as system level search module 700, when an upgrade to an application on the same computing device as system level search module 707 is installed, in response to a request from the user to register with system level search module 700, in response to a request from another module or device to register with system level search module 700, and so forth.

Additionally, the application itself can perform the registration process to register itself with system level search module 700, or alternatively another application or module can perform the registration process to register the application with system level search module 700. For example, an installer application or module can, when installing the application on the computing device that includes system level search module 700, perform the registration process to register the application with system level search module 700.

As part of the registration process, registration information for the application being registered is provided to application registration module 706. Various different registration information can be provided to application registration module 706. In one or more embodiments, the registration information includes an indication of how the application that is being registered is to be launched by UI module 702 and how the search term is to be provided to the application. This indication of how the application is to be launched by UI module 702 can vary by application, and can include, for example, an indication of an executable file to be run, an indication of one or more parameters to be used when beginning running the file or to be passed to the application after it is running, an indication of one or more application programming interfaces (APIs) of the application to invoke in order to pass the application one or more parameters, and so forth. Similarly, the indication of how the search term is to be provided to the application by module 702 can vary by application, and can include, for example, an indication of how the search term (and optionally other context information) is to be provided to the application when beginning running the application, an indication of one or more APIs of the application to invoke in order to pass the application the search term (and optionally other context information), and so forth.

Various other information can be included in the registration information. For example, the registration information can include metadata describing the application, such as a particular application category that the application is classified as (e.g., game, music, movie, publications, shopping, productivity, social networking, and so forth), a particular type of content that the application services (e.g., movies, electronic books, games, music, etc.), a web domain used by the application (e.g., web domain of a device or service accessed over a network), and so forth. By way of another example, the registration information can include information indicating how the application is to be identified in the search identification portion of the system level search UI (e.g., one or more icons to use, one or more names to use, one or more colors or fonts to use, one or more animations to display, and so forth). By way of yet another example, the registration information can include information describing requirements of the application (e.g., whether the application relies on Internet or other network access to another device or service).

The registration information can include information describing the behavior of the application with respect to searching. For example, the registration information can include an indication of whether the application supports word wheeling (displaying search results as each character for a search term is entered) or just searching after a user request to search for the search term is received (e.g., after user selection of a "search" button or selection of an application-specific scope identifier of the application is received). By way of another example, the registration information can include an indication of whether the application provides type ahead results and/or an input method editor. By way of yet another example, the registration information can include a keyboard shortcut key to be used to have the search UI associated with the application displayed. By way of still another example, the registration information can include an indication of whether the application provides counts of how many entries are included in the search results for the application so that a preview of the results for that application-specific scope can be displayed.

It should also be noted that the registration information can be provided by the application being registered, or alternatively by another device, component, or module. For example, at least some of the registration information can be provided by a merchant or manufacturer of the application. By way of another example, the application may have an associated manifest or other metadata that includes the registration information, and an installer application or module that is installing the application can provide the registration information on behalf of the application.

Application registration module 706 stores the registration information received as part of the registration process for an application in application registration store 708. The registration information is stored as being associated with or corresponding to the application, such as by storing the registration information with a corresponding application identifier. The application identifier can take a variety of different forms, such as a combination of application name and manufacturer, an identifier assigned to the application by the application manufacturer or by system level search module 700, and so forth. Application registration store 708 can be a database, list, or other data structure storing registration information for different applications. Application registration store 708 can be subsequently accessed by user interface module 702 to identify applications that are to be displayed as part of the search identification portion of the system level search UI.

Application ranking module 704 assigns a ranking to each application registered in application registration store 708. This ranking is used to determine an order in which applications are displayed (e.g., as application-specific scope identifiers) in the search identification portion of the system level search UI. Furthermore, situations can arise where there are more applications that have registered with system level search module 700 than can be displayed by the system level search UI. In such situations, the ranking is used to determine which applications are to be displayed by the system level search UI. Alternatively, the order in which applications are displayed and/or which applications are displayed can be determined in different manners, such as alphabetically by application name, randomly, according to other rules or criteria, and so forth.

Application ranking module 704 can use a variety of different criteria in ranking applications, such as metadata describing the applications (and included as registration information of the applications) and usage data for the applications. Application ranking module 704 can determine rankings in response to different events, such as the system level search UI being activated, a search term being entered by the user, and so forth. Alternatively, application ranking module 704 can pre-determine the rankings of the applications and use the pre-determined rankings when the search identification portion of the system level search UI is being displayed. The pre-determined rankings can be generated at regular or irregular intervals (e.g., approximately daily or weekly, when a new application registers with application registration module 706, and so forth). These pre-determined rankings can be maintained in application registration store 708 (e.g., an application ranking can be stored along with the registration information) or alternatively stored elsewhere.

The rankings determined by application ranking module 704 can be a particular score (e.g., a value ranging from 1 to 100), or alternatively can be an ordering of the applications from highest ranking to lowest ranking so that a determination can be readily made as to whether a particular application is ranked higher or lower than any other application. Applications with higher scores or higher rankings are typically deemed as being more relevant to the search term input by the user than applications with lower scores or lower rankings, although alternatively applications with lower scores or lower rankings can be deemed as being more relevant to the search term input by the user than applications with higher scores or higher rankings.

In one or more embodiments, to determine the ranking for a particular application ranking module 704 identifies characteristics of the particular application. Various characteristics of the particular application can be used to determine the ranking for a particular application. Multiple characteristics can be used to determine the ranking for a particular application, or alternatively a single characteristic can be used to determine the ranking for a particular application. A particular relevance score is generated for each of these characteristics being used to determine the ranking, and these relevance scores are input to one or more ranking algorithms. The one or more ranking algorithms combine the input relevance scores (e.g., by adding the scores, by assigning a weight to each of the relevance scores and adding the weighted relevance scores, and so forth) to generate a ranking for the application. The combination of the relevance scores for the application can be the ranking for the application. Alternatively, the combined relevance scores for all of the registered applications can be generated and the registered applications can be ordered based on their combined relevance scores (e.g., from highest combined relevance score to lowest combined relevance score), and this ordering can be the rankings of the applications.

One characteristic that can be used to determine the ranking for an application is metadata describing the application. Metadata describing the application is provided as registration information for the application as discussed above. Application ranking module 704 identifies the application category of the currently active application (e.g., an identifier of the currently active application can be obtained from the operating system and used as a lookup in application registration store 708 to determine registration information for that application). If the application is in the same category as the currently active application, then the application is assigned a higher relevance score (e.g., a value of 1), and if the application is not in the same category as the currently active application then the application is assigned a lower relevance (e.g., a value of 0).

Another characteristic that can be used to determine the ranking for an application is usage data for the application. Information regarding the usage of an application can be monitored and maintained by system level search module 700. As the user selects applications to be searched and search terms using system level search module 700, the information regarding which applications were selected to be searched and the search terms that were input for searching can be readily identified and a record of such maintained by system level search module 700. The information regarding the usage of an application can be, for example, how frequently the application is selected as the application to be searched via the system level search UI, how recently the application was selected as the application to be searched via the system level search UI, how frequently the application is selected as the application to be searched for the current search term via the system level search UI, how recently the application was selected as the application to be searched for the current search term via the system level search UI, and so forth. Additionally, if applications support search user interfaces that can be searched separately from the system level search UI, then those applications can monitor usage data and provide such usage data to application ranking module 704 as well.

The usage information can be used to generate a numeric value that is the relevance score for an application. For example, a numeric value for the frequency with which an application is selected as the application to be searched via the system level search UI can be generated by dividing the number of times that the application is selected by the total number of application selections (e.g., over some time period, such as the previous week, previous month, etc.). By way of another example, a numeric value for how recently the application was selected as the application to be searched for the current search term via the system level search UI can be generated by identifying how long ago (e.g., in minutes, hours, days, etc.) the application was last selected as the application to be searched for the current search term via the system level search UI.

Another characteristic that can be used to determine the ranking for an application is the web domain for the application. The web domain of an application is provided as registration information for the application as discussed above. Application ranking module 704 can forward the current search term entered by the user to an Internet search engine, analyze the results returned by the Internet search engine, and assign the application a relevance score based on where the web domain appeared in the results returned by the Internet search engine. A numeric value that is the relevance score for the application based on the web domain of the application can be generated, for example, by identifying how high or early the web domain is in the results returned by the Internet search engine. For example, if the results returned by the Internet search engine list the web domain of the application as the first result, then the relevance score for the application is 1 (or alternatively a particular value minus 1). By way of another example, if the results returned by the Internet search engine list the web domain of the application as the result fifth from the top or first search result, then the relevance score for the application is 5 (or alternatively a particular value minus 5). Alternatively, if the results returned by the Internet search engine indicate that no results are available that include the web domain, then the application can be excluded from the applications displayed in the search identification portion of the system level search UI. For example, application ranking module 704 can indicate to user interface module 702 that the application is to be excluded, in response to which user interface module 702 does not include an identifier of the application in the search identification portion of the system level search UI. Alternatively, application ranking module 704 can forward the web domain of the application to a web service that returns a relevance score for the application. The manner in which the web service determines the relevance score can vary and is determined by the web service.

In alternate embodiments, application ranking module 704 maintains rankings for applications that are specified by (and can be input in a variety of different manners by) a user. The user is thus able to customize the rankings for the applications as he or she desires. The application ranking module 704 need not use any other criteria to determine the rankings for the applications, and can just use the user-specified rankings as the rankings that are generated or determined by application ranking module 704. These user-specified rankings for applications can be maintained with the other information regarding the registered applications in application registration store 708, or alternatively can be maintained elsewhere.

User interface module 702 uses the information in application registration store 708 and the rankings generated by application ranking module 704 to determine the applications to include in the search identification portion of the system level search UI and/or the ordering of the applications included in the search identification portion of the system level search UI. In one or more embodiments, the search identification portion of the system level search UI can display no more than a threshold number of applications. If more than the threshold number of applications are registered with system level search module 700, then user interface module 702 selects the threshold number of applications that are registered with system level search module 700 and have the highest rankings (or alternatively the lowest rankings). For example, if search identification portion of the system level search UI can display only 5 application identifiers, then user interface module 702 selects the 5 highest ranked applications (e.g., the applications having the 5 largest combined relevance scores, the 5 applications at the beginning or ending of an ordering of applications based on their combined relevance scores, and so forth) and includes identifiers of those 5 highest ranked applications in the search identification portion of the system level search UI. The threshold number of applications can optionally be configured by a user or administrator of system level search module 700.

User interface module 702 can also use the information in application registration store 708 to determine the applications to include in the search identification portion of the system level search UI. In one or more embodiments, the registration information provided by the application includes requirements of the application as discussed above. User interface module 702 checks whether these requirements are satisfied, and does not include the application in the search identification portion of the system level search UI if the requirements are not satisfied.

The manner in which user interface module 702 determines whether the requirements of the application are satisfied varies based on the particular requirements. For example, the registration information can indicate that an Internet connection is required (e.g., to access a data store on a remote computing device, such as a computing device 104 of FIG. 1). User interface module 702 queries a component or module (e.g., of the operating system on the same computing device as system level search module 700) to determine whether the computing device currently has an Internet connection. If the computing device currently has an Internet connection, then the requirement is satisfied and the application can be included in the search identification portion of the system level search UI. However, if the computing device does not currently have an Internet connection, then the requirement is not satisfied and the application is not included in the search identification portion of the system level search UI. Alternatively, if the computing device does not currently have an Internet connection, then the application can be displayed in the search identification portion but with a different appearance (e.g., shadowed out to indicate that the application may not be able to search for the search term) or with text, an icon, or some other indication that the application may not be able to search for the search term.

Additionally, in one or more embodiments user interface module 702 determines the ordering of the applications included in the search identification portion of the system level search UI based on the rankings. The application identifiers are displayed in the search identification portion of the system level search UI in order in accordance with the rankings of the applications. The manner in which the application identifiers are displayed in accordance with their rankings can vary by implementation. For example, application identifiers can be displayed top to bottom in the search identification portion of the system level search UI in order from highest ranking to lowest ranking. E.g., referring to FIG. 2, the application identified by "Application 1 Name" would have a higher ranking than the application identified by "Application 2 Name". By way of another example, application identifiers can be displayed left to right in the search identification portion of the system level search UI in order from highest ranking to lowest ranking.

User interface module 702 can also make various other modifications to the application identifiers based on the rankings. For example, application identifiers for higher ranked applications (e.g., one or more highest ranked applications, applications having rankings above a threshold value, etc.) can be displayed in a different font, in a different color, with animations, in a larger size, and so forth. By way of another example, application identifiers can be displayed in different sizes, with application identifiers of higher ranked applications being larger icons, symbols, font sizes, etc. than application identifiers of lower ranked applications.

Thus, user interface module 702 displays application identifiers in the search identification portion of the system level search UI based on the rankings of the applications. The application identifier that is displayed by user interface module 702 is obtained from application registration store 708 (as provided during the registration process for the application). When a user selects a particular application identifier (or a particular application is to be searched), user interface module 702 accesses application registration store 708 to identify how to launch the application. User interface module 702 retrieves this information from application registration store 708 and provides the information to the operating system, which in turn launches the application. In addition, user interface module 702 provides the search term entered by the user in the data entry portion of the system level search UI to the selected application. The selected application then searches for the search term, and generates (and displays if selected) the appropriate results. The search term is provided to the selected application in the manner indicated by the selected application in the registration information previously provided by the selected application.

User interface module 702 can also provide various additional context information to the application that is performing the search. Context information refers to information regarding the user of the computing device and/or the search being requested (the search term itself can be referred to as context information for the search). Context information can include, for example, an identifier of a user of the computing device (e.g., obtained from another component or module of the operating system), an indication that a user is logged into the computing device (e.g., allowing the application itself to identify the user), an indication of the currently active application, an indication of the category of the currently active application, an indication of one or more applications that the user has previously selected to be searched for the search term, an indication of the category of each of one or more applications that the user has previously selected to be searched for the search term, and so forth.

An application that receives the context information for the search can use the context in any manner that the application desires, and can use all of the context information or only some of the context information. For example, an application may use the search term to generate search results, but ignore any other context information for the search. By way of another example, the application may use the search term to generate search results and also categories of applications that the user has previously selected to be searched for the search term to generate search results that include data of the same category (e.g., movie files if the categories of the applications previously searched by the user were movies).

Figure 8:
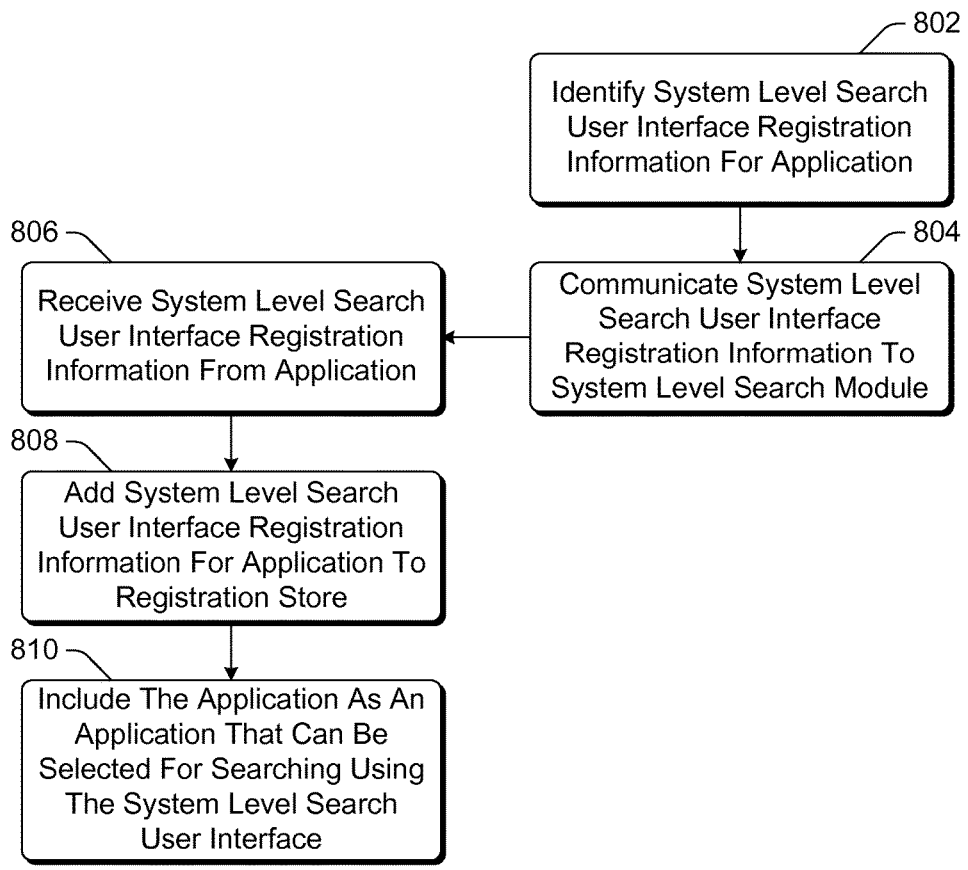
FIG. 8 is a flowchart illustrating an example registration process for registering an application with a system level search module in accordance with one or more embodiments.

FIG. 8 is a flowchart illustrating an example registration process 800 for registering an application with a system level search module in accordance with one or more embodiments. Process 800 can be implemented in software, firmware, hardware, or combinations thereof. Acts of process 800 illustrated on the left-hand side of FIG. 8 are carried out by a system level search module, such as system level search module 700 of FIG. 7. Acts of process 800 illustrated on the right-hand side of FIG. 8 are carried out by and/or behalf of an application, such as an application 112 of FIG. 1. Acts of process 800 illustrated on the right-hand side can be carried out by the application itself, or by another component or module on behalf of the application (e.g., by an application installer, by a merchant or manufacturer of the application, and so forth). Process 800 is shown as a set of acts and is not limited to the order shown for performing the operations of the various acts. Process 800 is an example process for registering an application with a system level search module; additional discussions of registering an application with a system level search module are included herein with reference to different figures.

In process 800, system level search UI registration information for the application is identified (act 802). The system level search UI registration information includes an indication of how the application is to be launched by the system level search module. A variety of additional information can also be identified as system level search UI registration information as discussed above.

The identified system level search UI registration information is communicated to the system level search module (act 804). This registration information can be communicated to an application registration module of the system level search module as discussed above.

The system level search module receives the system level search UI registration information from the application (act 806), and adds the received system level search UI registration information to a registration store (act 808).

The application is included as an application that can be selected for searching using the system level search UI (act 810). An identifier of the application (which can be included in the system level search UI registration information provided by the application) can be displayed to the user, allowing the user to select the application to search for one or more search terms as discussed above.

Returning to FIG. 7, as discussed above user interface module 702 generates the information to be displayed as the system level search UI and also interacts with applications, which can include launching user-selected applications. User interface module 702 can also have additional interactions with the currently active application, providing information to and receiving information from the currently active application. The currently active application refers to the application (e.g., one of applications 112 of FIG. 1) that is currently running in the foreground and is the application that the user can interact with, as discussed above. An indication of the currently active application is maintained by a module of the operating system, and the indication can be obtained by user interface module 702 from this module of the operating system.

It should be noted that the currently active application can change over time in response to user input and/or requests from another application or module running on the computing device. For example, a user can select an application identifier from the search identification portion of the system level search UI, and in response the application corresponding to the selected application identifier becomes the currently active application. By way of another example, separately from the system level search UI the user can select to launch an application or select an application to interact with, and in response the selected application becomes the currently active application.

In one or more embodiments, user interface module 702 provides user input as it is received to the currently active application. Each character or other symbol entered by the user is provided to the currently active application in response to the character or symbol being input. In response to the user input, the currently active application can generate zero or more suggested search terms based on that input. The currently active application can generate the zero or more suggested search terms in a variety of different manners, such as based on previous data input by the user, based on searchable data or a dictionary that is maintained by the application, and so forth. The zero or more suggested search terms are returned to user interface module 702, which displays the suggested search terms as part of the system level search UI. The suggested search terms can be displayed in different locations, such as in a list of menu items adjacent to the data entry portion of the system level search UI. The user can select one of the suggested search terms, and in response user interface module 702 displays the suggested search term in the data entry portion of the system level search UI.

For example, if a user is entering a search term and the first character entered by the user is the letter "H", user interface module 702 sends the currently active application an indication that the letter "H" has been entered by the user. The currently active application generates zero or more suggested search terms (e.g., Home, House, Hydrogen, Hello, etc.) and returns those suggested search terms to user interface module 702. User interface module 702 displays those suggested search terms as part of the system level search UI. The user can then select one of those suggested search terms as at least part of the user's desired search term in a variety of different manners (e.g., via input module 114 of FIG. 1), such as touching the suggested search term with a stylus or finger, maneuvering a pointer over the suggested search term and pressing a button of a cursor control device (e.g., a mouse), and so forth. In response to a user selection of a suggested search term, user interface module 702 displays the selected suggested search term in the data entry portion of the system level search UI.

Continuing with this example, if the user does not select one of the suggested search terms but instead enters the letter "e", so that the user's input so far is "He", user interface module 702 sends the currently active application an indication that the letters "He" have been entered by the user. The currently active application generates zero or more suggested search terms (e.g., Help, Hello, Henry, etc.) and returns those suggested search terms to user interface module 702. User interface module 702 displays these newly suggested search terms as part of the system level search UI. This process can continue until the user selects an application to search for the search term that he or she has entered.

Although the suggested search terms are discussed herein as being text search terms, various other content and/or types of content can be returned to user interface module 702. This other content and/or types of content can be displayed or otherwise presented by user interface module 702 in addition to, or alternatively in place of, the returned suggested search terms. For example, one or more images related to one or more suggested search terms can be returned and displayed, additional descriptive text related to one or more suggested search terms can be returned and displayed, audio content related to one or more suggested search terms can be returned and played back, and so forth.

Figure 9:
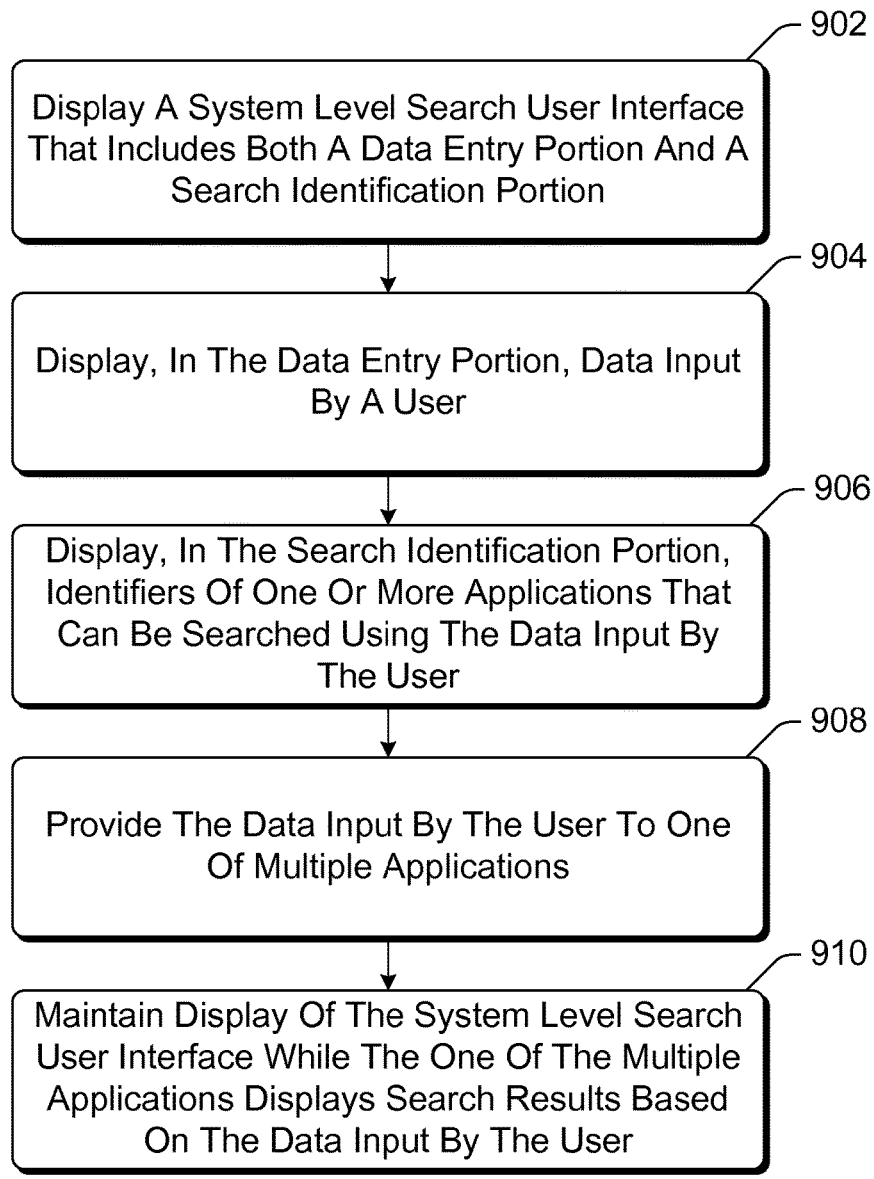
FIG. 9 is a flowchart illustrating an example process for using a system level search user interface in accordance with one or more embodiments.

FIG. 9 is a flowchart illustrating an example process 900 for using a system level search user interface in accordance with one or more embodiments. Process 900 is carried out by a system level search module, such as system level search module 700 of FIG. 7, and can be implemented in software, firmware, hardware, or combinations thereof. Process 900 is shown as a set of acts and is not limited to the order shown for performing the operations of the various acts. Process 900 is an example process for using a system level search user interface; additional discussions of using a system level search user interface are included herein with reference to different figures.

In process 900, a system level search UI is displayed that includes both a data entry portion and an search identification portion (act 902). The system level search UI can be displayed in a variety of different locations on a screen display as discussed above.

Data that is input by a user is displayed in the data entry portion of the system level search UI (act 904). Data can be input by the user in a variety of different manners as discussed above.

Identifiers of one or more applications that can be searched using the data input by the user are displayed in the search identification portion (act 906). These identifiers can take a variety of different forms, such as names, icons, animations, and so forth as discussed above. The identifiers displayed in act 906 are identifiers of one or more applications that have registered for use with the system level search UI, and can be selected in different manners as discussed above.

The data input by the user is provided to one of multiple applications on the device implementing the system level search UI (act 908). As discussed above, the data input can be provided to a currently active application (e.g., by selection of a search button as discussed above), or to an application corresponding to an application identifier that is displayed in the search identification portion and selected by the user.

The system level search UI display is maintained while the application to which the data input by the user is provided obtains and displays search results based on the data input by the user (act 910). The application manages display of the search results (e.g., in a window of the application) as discussed above, while the system level search UI remains displayed.

Figure 10:
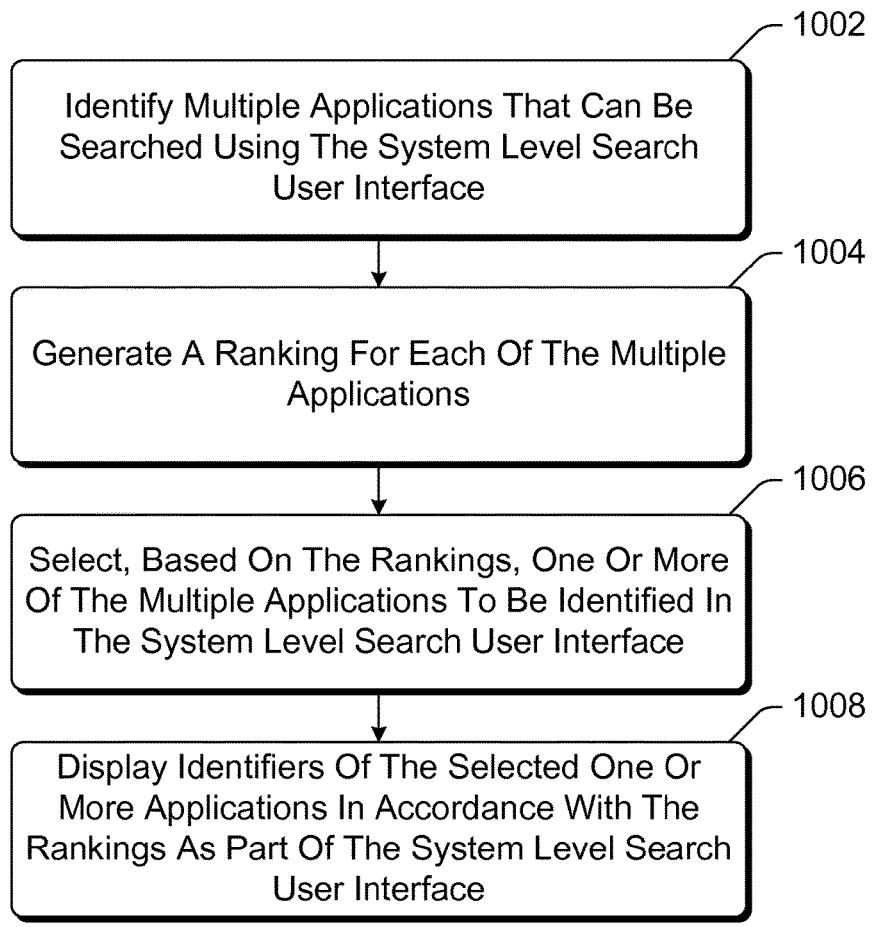
FIG. 10 is a flowchart illustrating an example process for displaying application identifiers in a search identification portion of a system level search user interface in accordance with one or more embodiments.

FIG. 10 is a flowchart illustrating an example process 1000 for displaying application identifiers in an search identification portion of a system level search user interface in accordance with one or more embodiments. Process 1000 is carried out by a system level search module, such as system level search module 700 of FIG. 7, and can be implemented in software, firmware, hardware, or combinations thereof. Process 1000 is shown as a set of acts and is not limited to the order shown for performing the operations of the various acts. Process 1000 is an example process for displaying application identifiers in an search identification portion of a system level search user interface; additional discussions of displaying application identifiers in an search identification portion of a system level search user interface are included herein with reference to different figures.

In process 1000, multiple applications that can be searched using the system level search UI are identified (act 1002). These multiple applications are applications that have registered to use the system level search UI as discussed above.

A ranking is generated for each of the multiple applications (act 1004). These rankings can be generated in a variety of different manners, as discussed above, including optionally using user-specified rankings. These rankings can be, for example, a particular score or an ordering of the applications from highest to lowest as discussed above.

One or more of the multiple applications that are to be identified in the system level search UI are selected based at least in part on the rankings (act 1006). If there are more applications than can be identified in the system level search UI, then one or more of the applications are selected based on their rankings as discussed above.

Identifiers of the selected one or more applications are displayed in accordance with the rankings as part of the system level search UI (act 1008). The manner in which the application identifiers are displayed in accordance with their rankings can vary by implementation as discussed above, such as displaying application identifiers top to bottom in order from highest ranking (at the top) to lowest ranking (at the bottom), from left to right in order from highest ranking (at the left) to lowest ranking (at the right), and so forth.

It should be noted that any of a variety of different types of information can be searched for by a user, such as contact information for other users, movies, games, books or other publications, and so forth.

In the discussions herein, reference is made to launching a user selected application and the selected application searching for the search term. It should be noted that situations can arise where the selected application is already running (e.g., in the background), and thus does not need launching. In such situations, the system level search module (e.g., module 700 of FIG. 7) communicates a request to the selected application to search for the search term. In response, the selected application searches for the search term and generates (and displays if selected) its search results. In one or more embodiments the application includes, as part of the registration information it provides to the system level search module, an indication of how the system level search module is to request that the application search for the search term. For example the registration information can include an indication of one or more APIs of the application to invoke in order to pass the application the search term (and optionally other context information). Alternatively other techniques can be used, such as when the application begins running the application can notify the system level search module of how the system level search module can request that the application search for the search term, the system level search module can communicate the request via a pre-established communication channel or following a protocol known to both the application and the system level search module, and so forth.

The system level search UI discussed herein allows the user to enter the search term once and select different applications to be searched for that search term as discussed above. Each individual application performs its own searching, and need have no knowledge of (and typically has no knowledge of) other applications that may be selected by the user for searching. The manner in which an application performs its searching, as well as the data stores accessed by the application in performing its search, can vary by application. The application can search local data stores (data stores located on the same computing device as implements the system level search UI), and/or remote data stores (e.g., data stores located on another computing device, such as a device 104 of FIG. 1).

The search results generated by the applications are displayed in the search results portion (e.g., search results portion 208 of FIGS. 2-6) by the application generating those search results. Each application is thus able to customize the display of its search results in any manner that it desires. Despite these different displays for search results, however, the data entry portion and search identification portion of the system level search UI remain the same. The system level search UI is maintained in the same location, and the appearance does not alter based on the search results (although a data input cue and suggested search terms may change based on the currently active application as discussed above).

Figure 11:
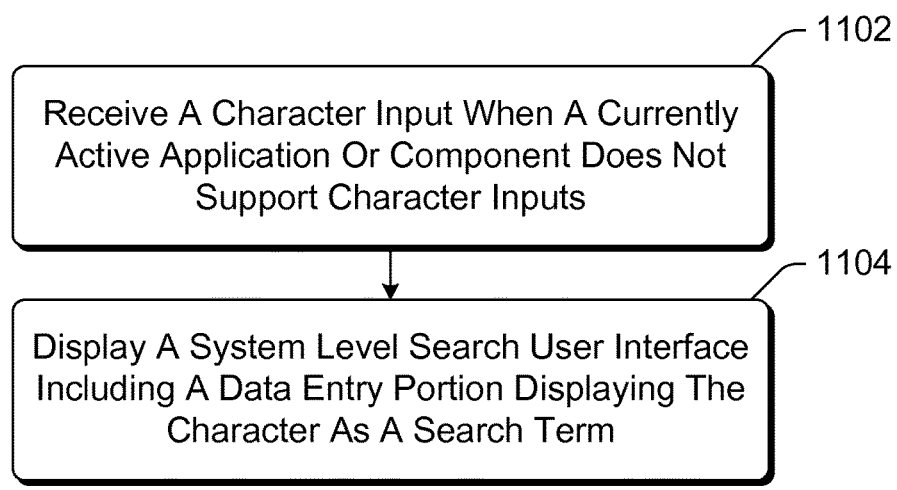
FIG. 11 is a flowchart illustrating an example process for facilitating interaction with a system level search user interface in accordance with one or more embodiments.

FIG. 11 is a flowchart illustrating an example process 1100 for facilitating interaction with a system level search user interface in accordance with one or more embodiments. Process 1100 is carried out by a system level search module, such as system level search module 700 of FIG. 7, and can be implemented in software, firmware, hardware, or combinations thereof. Process 1100 is shown as a set of acts and is not limited to the order shown for performing the operations of the various acts. Process 1100 is an example process for facilitating interaction with a system level search user interface; additional discussions of facilitating interaction with a system level search user interface are included herein with reference to different figures.

In process 1100, a character input is received when a currently active application or operating system component does not support character inputs (act 1102). The character inputs can be inputs of alphanumeric characters as discussed above.

In response to receiving the character input, a system level search user interface is displayed including a data entry portion displaying the character as a search term (act 1104). The system level search user interface also includes a search results portion displaying search results generated by a particular application based on the search term, such as a currently active or most frequently used application as discussed above. Alternatively, search results for other scopes can be displayed, and the scope for which search results are displayed can be determined in different manners as discussed above.

Figure 12:
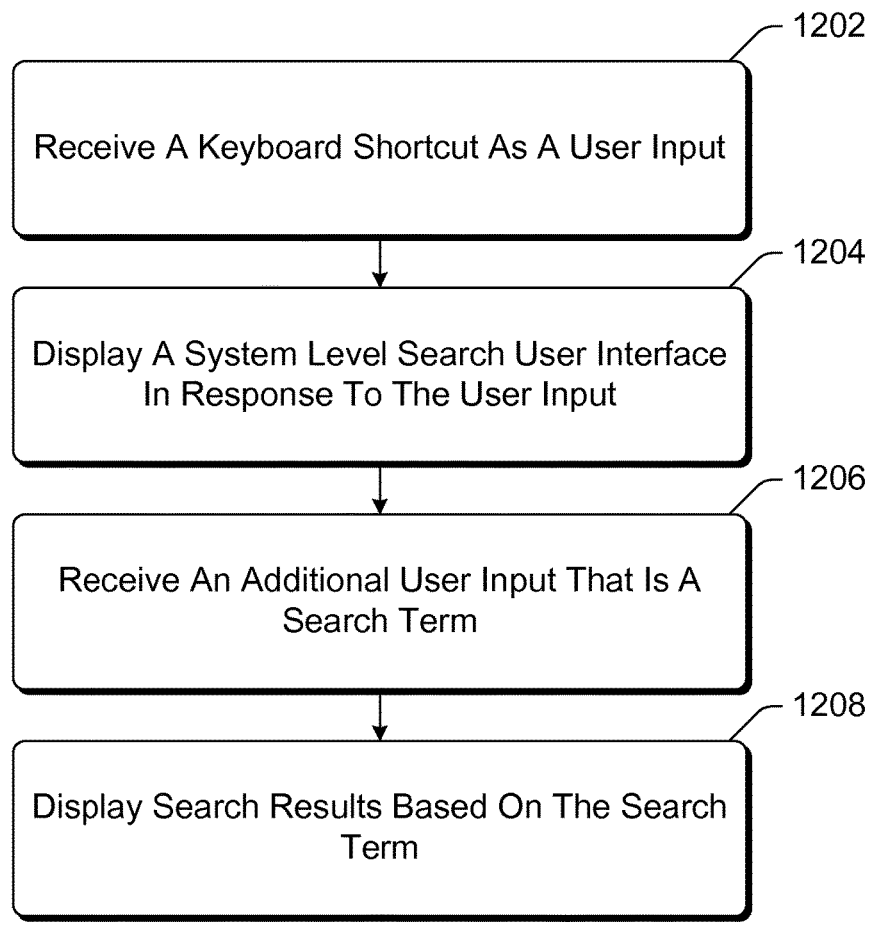
FIG. 12 is a flowchart illustrating another example process for facilitating interaction with a system level search user interface in accordance with one or more embodiments.

FIG. 12 is a flowchart illustrating another example process 1200 for facilitating interaction with a system level search user interface in accordance with one or more embodiments. Process 1200 is carried out by a system level search module, such as system level search module 700 of FIG. 7, and can be implemented in software, firmware, hardware, or combinations thereof. Process 1200 is shown as a set of acts and is not limited to the order shown for performing the operations of the various acts. Process 1200 is an example process for facilitating interaction with a system level search user interface; additional discussions of facilitating interaction with a system level search user interface are included herein with reference to different figures.

In process 1200, a keyboard shortcut is received as a user input (act 1202). Various different keyboard shortcuts associated with different scopes can be received as discussed above.

A system level search user interface is displayed in response to the user input (act 1204). Various different search user interfaces can be displayed based on the particular keyboard shortcut, such as an application scope search user interface, a settings scope search user interface, a file scope search user interface, or an application-specific scope search user interface.

An additional user input that is a search term is also received (act 1206), and search results are displayed based on the search term (act 1208). The displayed search results are the search results generated for the scope associated with the received keyboard shortcut, as discussed above.

Figure 13:
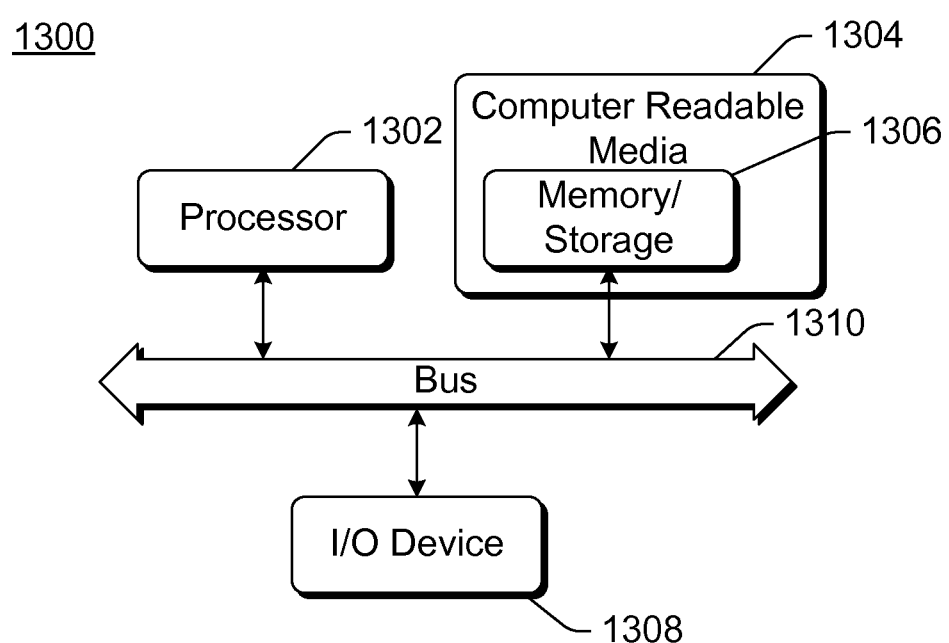
FIG. 13 illustrates an example computing device that can be configured to implement the system level search user interface in accordance with one or more embodiments.

FIG. 13 illustrates an example computing device 1300 that can be configured to implement the system level search user interface in accordance with one or more embodiments. Computing device 1300 can be, for example, computing device 102 or 104 of FIG. 1.

Computing device 1300 includes one or more processors or processing units 1302, one or more computer readable media 1304 which can include one or more memory and/or storage components 1306, one or more input/output (I/O) devices 1308, and a bus 1310 that allows the various components and devices to communicate with one another. Computer readable media 1304 and/or one or more I/O devices 1308 can be included as part of, or alternatively may be coupled to, computing device 1300. Processor 1302, computer readable media 1304, one or more of devices 1308, and/or bus 1310 can optionally be implemented as a single component or chip (e.g., a system on a chip). Bus 1310 represents one or more of several types of bus structures, including a memory bus or memory controller, a peripheral bus, an accelerated graphics port, a processor or local bus, and so forth using a variety of different bus architectures. Bus 1310 can include wired and/or wireless buses.

Memory/storage component 1306 represents one or more computer storage media. Component 1306 can include volatile media (such as random access memory (RAM)) and/or nonvolatile media (such as read only memory (ROM), Flash memory, optical disks, magnetic disks, and so forth). Component 1306 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1302. It is to be appreciated that different instructions can be stored in different components of computing device 1300, such as in a processing unit 1302, in various cache memories of a processing unit 1302, in other cache memories of device 1300 (not shown), on other computer readable media, and so forth. Additionally, it is to be appreciated that the location where instructions are stored in computing device 1300 can change over time.

One or more input/output devices 1308 allow a user to enter commands and information to computing device 1300, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 13. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth.

The features of the system level search user interface techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, at a computing device when a currently active application is running in a foreground of the computing device, a character input, the currently active application supporting user interaction via non-character input keys but supporting no character inputs;
determining that the currently active application supports no character inputs; and
displaying, in response to determining the currently active application supports no character input, a system level search user interface treats the character input received as an universal search user interface request, wherein the system level search user interface having both a data entry portion displaying the character as a search term, and a search identification portion in which one or more identifiers of scopes are displayed and, if no search results are generated based on the search term then changing which of the one or more identifiers of scopes is focused on in response to user selection of one or more keyboard arrow keys without user selection of the search identification.

2. A method as recited in claim 1, the system level search user interface allowing a user to select an application and have displayed, in response to user selection of the application, search results for the selected application based on the search term.

3. A method as recited in claim 1, the system level search user interface having a first portion in which the search term is displayed, and a second portion in which identifiers of one or more scopes searchable using the search term are displayed.

4. A method as recited in claim 3, the system level search user interface comprising an application scope search user interface displaying search results identifying one or more applications on the computing device that include the search term.

5. A method as recited in claim 3, the system level search user interface comprising a settings scope search user interface displaying search results identifying one or more configuration setting controls on the computing device that include the search term.

6. A method as recited in claim 3, the system level search user interface comprising a file scope search user interface displaying search results identifying one or more files on the computing device that include the search term.

7. A method as recited in claim 3, the system level search user interface comprising a search user interface displaying search results generated by the currently active application based on the search term.

8. A method as recited in claim 3, the system level search user interface comprising a search user interface displaying search results generated by a most frequently used application based on the search term.

9. A method as recited in claim 1, the displaying further comprising:
displaying search results based on the search term in a search results portion of the system level search user interface with a first entry of multiple entries of the search results focused on; and
bringing focus to the search results portion in response to user selection of the first entry without user selection of the search results portion.

10. A method as recited in claim 1, the displaying further comprising:
displaying search results based on the search term in a search results portion of the system level search user interface with a first entry of multiple entries of the search results focused on; and
changing which of the multiple entries is focused on in response to user selection of one or more keyboard arrow keys without user selection of the search results portion.

11. A computing device comprising:
one or more processors; and
one or more computer storage media having stored thereon multiple instructions that, responsive to execution by the one or more processors, cause the one or more processors to:
receive, at the computing device, a user input that is a keyboard shortcut; and
display, in response to the user input, a system level search user interface having a first portion in which a search term is displayed and a second portion in which multiple user-selectable identifiers are displayed, each of the multiple user-selectable identifiers identifying one of multiple scopes searchable using the search term, the multiple scopes including one or more applications searchable using the search term, the system level search user interface being displayed in response to the keyboard shortcut being a particular key sequence or group of keys unique to one of the multiple user-selectable identifiers displayed in the system level search user interface.

12. The computing device as recited in claim 11, the system level search user interface comprising an application scope search user interface displaying search results identifying one or more applications on the computing device that include the search term.

13. The computing device as recited in claim 11, the system level search user interface comprising a settings scope search user interface displaying search results identifying one or more configuration setting controls on the computing device that include the search term.

14. The computing device as recited in claim 11, the system level search user interface comprising a file scope search user interface displaying search results identifying one or more files on the computing device that include the search term.

15. The computing device as recited in claim 11, the system level search user interface further including a third portion in which search results are displayed, the search results being based on the search term and which of the multiple user-selectable identifiers in the second portion is focused on.

16. The computing device as recited in claim 11, the system level search user interface further including, for each of the multiple user-selectable identifiers, an indication of a number of entries in the search results for the identified one of the multiple scopes based on the search term.

17. The computing device as recited in claim 11, the multiple instructions further causing the one or more processors to:
display, in a third portion of the system level search user interface, search results based on the search term, the third portion having a first entry of multiple entries of the search results focused on; and
bringing focus to the search results portion in response to user selection of the first entry without user selection of the third portion.

18. The computing device as recited in claim 11, the multiple instructions further causing the one or more processors to:
display, in a third portion of the system level search user interface, search results based on the search term, the third portion having a first entry of multiple entries of the search results focused on; and
change which of the multiple entries is focused on in response to user selection of one or more keyboard arrow keys without user selection of the third portion.

19. A method comprising:
receiving, at a computing device, a first user input that is a keyboard shortcut;
displaying, in response to the first user input, a system level search user interface;
receiving, at the computing device, a second user input that is a search term; and
the system level search user interface having a first portion in which the search term is displayed, and a second portion in which multiple user-selectable identifiers are displayed, each of the multiple user-selectable identifiers identifying one of multiple scopes searchable using the search term, the system level search user interface being, in response to the keyboard shortcut being a particular key sequence or group of keys unique to one of the multiple user-selectable identifiers displayed in the system level search user interface:
an application scope search user interface displaying search results identifying one or more applications on the computing device that include the search term;
a settings scope search user interface displaying search results identifying one or more configuration setting controls on the computing device that include the search term; or
a file scope search user interface displaying search results identifying one or more files on the computing device that include the search term.

* * * * *